United States Patent [19]

Oda et al.

[11] Patent Number: 4,867,769
[45] Date of Patent: Sep. 19, 1989

[54] SUPPORTING STRUCTURE FOR CERAMIC TUBES IN A GAS SYSTEM

[75] Inventors: Noriyuki Oda, Chiga; Katsumi Higashi, Iruma; Hiroshi Maeno, Tokyo, all of Japan

[73] Assignee: Asahi Glass Company, Ltd., Tokyo, Japan

[21] Appl. No.: 296,692

[22] Filed: Jan. 13, 1989

[30] Foreign Application Priority Data

| Jan. 16, 1988 | [JP] | Japan | 63-7364 |
| Jan. 16, 1988 | [JP] | Japan | 63-7365 |
| Feb. 10, 1988 | [JP] | Japan | 63-29944 |

[51] Int. Cl.$^4$ .............................................. B01D 46/04
[52] U.S. Cl. ........................................ 55/302; 55/498; 55/507; 55/508; 55/523
[58] Field of Search ................ 55/269, 302, 485, 498, 55/507–509, 523

[56] References Cited

U.S. PATENT DOCUMENTS

| 4,735,635 | 4/1988 | Isralcson et al. | 55/302 X |
| 4,735,638 | 4/1988 | Cliberti et al. | 55/302 |

FOREIGN PATENT DOCUMENTS

| 0190701 | 8/1986 | European Pat. Off. |
| 62-123295 | 6/1987 | Japan . |
| 63-38791 | 2/1988 | Japan . |
| 63-38793 | 2/1988 | Japan . |
| 63-46395 | 2/1988 | Japan . |

OTHER PUBLICATIONS

Patent Abstracts of Japan, vol. 11, No. 344 (M-640)[2791], Seite 50 M 640, Nov. 11, 1987; & JP-A-62 123 295 (Asahi Glass Co., Ltd.) 04-06-1987.

*Primary Examiner*—Charles Hart
*Attorney, Agent, or Firm*—Oblon, Spivak, McClelland, Maier & Neustadt

[57] ABSTRACT

A supporting structure for ceramic tubes in a gas system in which a plurality of stages of tube support plates are provided in a substantially horizontal manner in a container, and ceramic tubes are supported with their axial lines being substantially vertical between the vertically adjacent tube support plates so that through holes formed in the tube support plates are communicated with the inner passages of the ceramic tubes, and metallic ring holders are respectively fitted to the outer periphery of the lower end portion of the tubes with interposed compacted layers while the metallic ring holders are in contact with the lower end faces of the tubes, and the ring holders are respectively in contact with and are supported by the tube support plates which are placed below the ring holders. Engaging means of the ceramic tubes to the tube support plates is also disclosed.

24 Claims, 12 Drawing Sheets

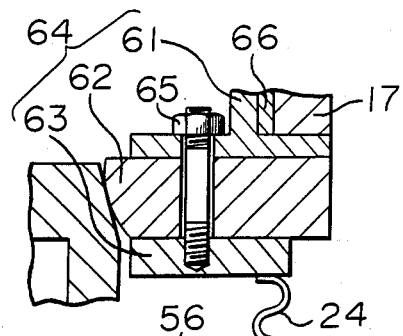
FIGURE 2
FIGURE 3
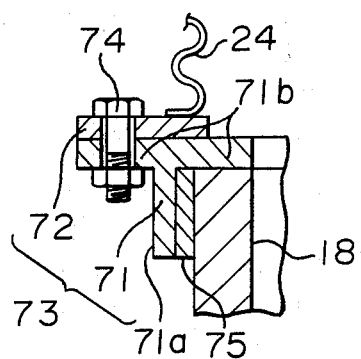
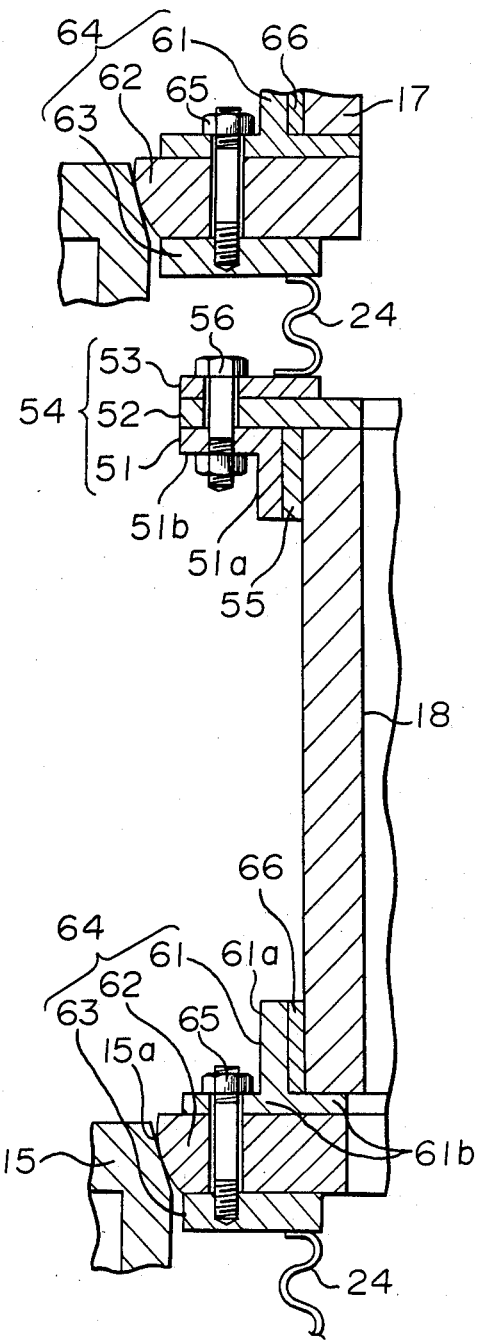

SUPPORTING STRUCTURE FOR CERAMIC TUBES IN A GAS SYSTEM

The present invention relates to a supporting structure for ceramic tubes in a gas system in which ceramic tubes which are disposed substantially in a vertical position between tube support plates provided in a container in a substantially horizontal manner. More particularly, it relates to a supporting structure for ceramic tubes in a gas system in which filter tubes made of gas-permeable ceramics are supported between tube support plates.

Heretofore, various types of filter systems using filter tubes made of gas-permeable porous ceramics have been proposed to remove dust contained in hot dust containing gases.

These filter systems are so constructed that a plurality of tube support plates are provided in a container so as to be substantially horizontal; filter tubes are supported with their axial lines being vertical between the adjacent upper and lower tube support plates; and a dust-containing gas is supplied to the inside or the outside of the filter tubes so that cleaned gas is obtainable from the outside or the inside of the filter tubes and the dust is trapped on the wall surface of the filter tubes.

In these filter systems, the filter tubes are made of ceramics in consideration that they may be used under the conditions of a high temperature or environments which may affect the durability of metallic material, and the container and the tube support plates are made of metal, which may be cooled if necessary.

Therefore, it was necessary to form a tube supporting structure capable of absorbing thermal expansion differences between the structural elements, especially between ceramic members and metallic members, during the temperature rise and fall, and free from breakage of the ceramic filter tubes weak in a shock when the filter system are installed or in use. Accordingly, measures have been taken in such a manner that each end portion of the fragile ceramic filter tubes is provided with a metallic ring body fixed through a compacted layer of a shock-absorbing material; the ring body is permitted to be displaced in the axial direction of the tubes by means of a metallic bellows and so on, whereby the ring bodies are respectively connected to end portions of the ceramic filter tubes adjacent to each other in the vertical direction or to a tube support plate.

FIG. 4 shows an example of the filter system of this kind which has been proposed by the inventors of the present patent application (Japanese Unexamined Patent Publication Nos. 123295/1987 and 38791/1988). In FIG. 4, there is shown a container 11. A header (not shown) with an inlet for dust-containing gas is provided above the container and a dust hopper (not shown) is provided below the container. In the container, four (in this example) tube support plates 13, 14, 15, 16 are attached thereto in a substantially horizontal manner with predetermined intervals in the vertical direction. Between the adjacent tube support plates 13 through 16, three filter tubes 17, 18, 19 are vertically arranged so that they are supported so as to be communicated with each other.

In a practical construction, a plurality of groups of filter tubes are supported for connection so that they are communicated with each other in the vertical direction and are arranged in plural rows so as to be in substantially parallel with each other in the container 11, even through they are omitted in the figure.

Cleaned gas discharge pipes 12 are attached to the circumferential wall of the container 11 so that each of the discharge pipe 12 corresponds to each section defined by the tube support plates.

Among connecting and supporting structures for the vertically arranged filter tubes 17, 18, 19, one for the filter tube 17 will be explained as an example. As shown in FIG. 5, a flange 20 made of ceramics is firmly attached to the outer periphery of the upper end portion of the filter tube 17. A pair of ring bodies 21, 22 are vertically arranged so as to interpose the flange 20 therebetween, and the ring bodies 21, 22 are fixed by fastening bolts 23.

The lower edge portion of a metallic bellows 24 is attached to the upper portion of the ring body 21, and the upper edge portion of the bellows 24 is connected to a supporting piece 26 attached to the tube support plate 13 by means of bolts 25. In FIGS. 4 and 5, the ring bodies 21, 22, the bellows 24, the supporting piece 26 and the tube support plate 13 are respectively made of metal. Accordingly, the upper end portion of the filter tube 17 is connected to and supported by the tube support plate 13 through the flange 20, the ring bodies 21, 22, the bellows 24 and the supporting piece 26 so that the displacement of the filter tube in its axial direction can be absorbed by the bellows 24.

The tube support plate 13 is so constructed as to be water-cooled from the inside to thereby indirectly cool the metallic members such as the bellows 24 by heat radiation. As a result, heat resistance properties of the entire system is improved, and a treatment for a hot dust-containing gas which has been impossible in a conventional non-cooling type metallic system, can be carried out.

As shown in FIG. 6, a compacted layer 27, which comprises a thermally expandable inorganic material such as vermiculite and ceramic fibers, is arranged on the outer periphery of the lower end portion of the filter tube 17. A cylindrical portion 29 of the ring body 28 is fixed to the outer periphery of the compacted layer 27. The ring body 28 is provided with a flange portion 30 extending outwardly from the cylindrical portion 29.

An annular base seat 32 is attached to the lower surface of the flange portion 30 by means of bolts 31, and the outer peripheral surface of the base seat 32 is formed to have a spherical surface. On the other hand, a receiving portion 33 with a taper is formed at a peripheral edge of a through hole in the tube support plate 14 so that the base seat 32 is in contact with and supported by the receiving portion 33. Accordingly, the lower end portion of the filter tube 17 is in contact with and supported by the receiving portion 33 formed at the peripheral edge of the through hole of the tube support plate 14 through the compacted layer 27, the ring body 28 and the base seat 32.

Further, in this filter system, when the inner diameter of the through hole of the tube support plate 13 is represented as $D_1$, the inner diameter of the through hole of the tube support plate 14 is as $D_2$, the inner diameter of the through hole of the tube support plate 15 is as $D_3$, the inner diameter of the through hole of the tube support plate 16 is as $D_4$, the outer diameters of the ring body 28 and the base seat 32 attached to the lower end portion of the filter tube 17 are respectively as $d_1$, the outer diameters of the ring body 28 and the base seat 32 attached to the lower end portion of the filter tube 18 are respectively as $d_2$ and the outer diameters of the ring body 28 and the base seat 32 attached to the lower end portion of the filter tube 19 are respectively as $d_3$ as shown in FIG. 7, a construction is so made as to have a relation of $D_1 > d_1 > D_2 > d_2 > D_3 > d_3 > D_4$.

With the construction as described above, it is possible that the filter tubes 19, 18, 17 in a previously connected state are sequentially inserted through the through hole formed in the tube support plate at the uppermost stage in the container 11 so that the base seats 32 attached to the lower end portions of the filter tubes are respectively brought into contact with the receiving portions 33 formed at the peripheral edges of the through holes of the corresponding tube support plates 16, 15, 14. Such constructions of the filter system allows easy assembling and disassembling operations for the filter tubes.

On the other hand, each of the cleaned gas discharge pipes 12 is attached to the container so as to correspond to each section which is defined by the two adjacent tube support plates. A throat portion 34 is formed in each of the cleaned gas discharge pipes 12 as shown in FIG. 4. An ejector nozzle 35 is arranged in the cleaned gas passage near the downstream side of the throat portion 34 so as to be open toward the upstream side of the cleaned gas passages.

As to the supporting structure for supporting the upper end portions of the filter tubes 17, 18, 19, the inventors proposed a structure as shown in FIG. 8 (Japanese Unexamined Patent Publication No. 046395/1988). Namely, a compacted layer 36 which comprises a thermally expandable inorganic material such as vermiculite and ceramic fibers is provided at the outer periphery of the upper end portion of the filter tube 17; a cylindrical portion 38 of a ring body 37 is mounted on the compacted layer 37, and the ring body 37 is provided with a flange portion 39 which extends outwardly from the cylindrical portion 38. A ring body 41 is attached to the upper surface of the flange portion 39 by means of bolts 40, and the lower edge portion of a bellows 29 is connected to the ring body 41.

In such filter system (refer to FIG. 4), a dust-containing gas is introduced from the upper part of the container 11 to be subsequently passed through the filter tubes 17, 18, 19 downwardly.

When the dust-containing gas is passed through the filter tubes 17, 18, 19, a gas component passes the walls of the filter tubes to flow as cleaned gas to the outside of the filter tubes 17, 18, 19. Then, dust contained in the dust-containing gas is trapped on the inner wall surface of the filter tubes 17, 18, 19, and the most part of the trapped dust is peeled off and falls downwardly by the dead weight to be collected on the dust hopper (not shown) placed at the lower part of the container 11. The cleaned gas flowing to the outside of the filter tubes 17, 18, 19 is taken out from the system through the cleaned gas discharge pipes 12.

By continuing such dust trapping operations, dust is accumulated on the inner wall surfaces of the filter tubes 17, 18, 19, and pressure head loss is increased as the gas is passed through the filter tubes, whereby dust trapping ability of the system decreases. In order to avoid reduction in the dust trapping ability, a back-washing operation is carried out by ejecting compressed gas through the ejector nozzles 35 at appropriate time intervals.

For effective back-washing operations, the gas pressure of the compressed gas should be more than 1.2 times as large as an inner gas pressure (the absolute pressure) of the container, especially more than a critical pressure ratio (about 1.6) as the velocity of gas at the nozzle outlet exceeds the velocity of sound. As ejection mode for the compressed gas, it is preferable that a highly pressurized gas is substantially instantaneously ejected through the ejector nozzle or nozzles 35 by operating high speed valve or valves which operate both the entirely opening motion and the entirely closing motion within a second, preferably within 0.5 second.

In order to obtain an effective back-washing operation with the gas pressure of the compressed gas having the critical pressure ratio or higher, it is desirable that the tip of the ejector nozzles 35 is constituted by a so-called Laval nozzle.

The gas ejected through the ejector nozzle 35 induces the ambient gas around the ejection nozzle 35 and flows as back-washing gas with a pressure wave into the container, whereby the gas pressure at the outside of the filter tubes 17, 18, 19 is pushed up to a level of several hundreds —15,000 mmAq as high as the inner pressure in the filter tubes. As a result, an instantaneous gas flow which passes through the wall of the filter tubes 17, 18, 19 from the outside to the inside of the tubes is produced to thereby peel off the dust accumulated on the inner wall surface of the filter tubes 17, 18, 19.

The back-washing operations are, in fact, carried out in an alternate basis for each section in the container defined by the tube support plates 13, 14, 15, 16 so that when the back washing operation is carried out for a certain section, the dust trapping operation is carried out for the other sections, and the dust trapping operation is continued in the filter system.

However, the following problem arised in the conventional filter system as described above.

Namely, the filter tubes 17, 18, 19 are supported by the tube support plates 14, 15, 16 by making their lower end portions contact with the receiving portions formed at the respective peripheral edges of the through holes of the corresponding tube support plates 14, 15, 16 by means of the respective ring bodies 28 and the base seats 32. The upper end portions of the filter tubes 17, 18, 19 are respectively supported by the peripheral edges of the through holes formed in the tube support plates or the filter tubes which are located above. Accordingly, the filter tubes can be moved in their axial direction (in the vertical direction).

In the above-mentioned state, when gas for back-washing is blown into, for instance, the section defined by the tube support plates 14, 15, a gas pressure in this section becomes higher than gas pressures in the other sections.

The pressure difference causes a pressure directing upward to the base seat 32 formed at the lower end portion of the filter tube 17 which is disposed above the filter tube 18. When the pressure directing upwardly exceeds a certain value, the filter tube 17 is instantaneously pushed up together with the ring bodies 28, 32, and then falls on the receiving portion. Thus, when the filter tube 17 is once raised and then falls, the bellows 24 attached to the upper end portion of the filter tube 17 is instantaneously compressed, and then returned to the original state, whereby an impact stress by the displacement is applied to the connecting portion of the ceramic flange 20 and the filter tube 17 through the ring bodies 21, 22 to which the bellows 24 is connected (FIG. 5). It has been found that an accident of breakage of the ceramic flange 20 has been often caused.

In the structure as shown in FIGS. 6 and 8, an impact stress by the displacement acts on the compacted layer 36 or 27 disposed between the filter tube 17 and the cylindrical portion 38 or 29 of the ring body 37 or 28, whereby the compacted layer 36 or 27 may be broken.

The similar problem takes place due to an external force applied to the ring bodies attached to the ceramic tubes during the working for installment or maintenance in which the filter tubes are assembled or disassembled.

Heretofore, the stress of displacement acting on the bonding portion between the flange 20 and the filter tube 17 and compacted layers 36 disposed between the cylindrical portions 37, 27 of the ring bodies 37, 28 and the filter tube 17 can be negligible because of the presence of the bellows 24 even when the filter tubes 17, 8, 19 are raised by the gas pressure in the back-washing and then, fall on the receiving portions. However, the following fact was found. Namely, when compressed gas is ejected through the ejector nozzle at a pressure 1.2 times as high as the inner pressure (the absolute pressure) of the container by operating the above-mentioned high-speed operating valve, there causes rising of the filter tubes and the subsequent falling of them. This causes an impact stress of displacement which may break the bonding portion of the ceramic flange 20 and the ceramic filter tube 17, and the compacted layers 36, 27 which is constituted by the ceramic fibers and the thermally expandable inorganic material.

It is unnecessary that the pressure difference of the back-washing, i.e. the pressure difference between the inside and the outside of the filter tubes during the back-washing operations is so large when dust which can easily be peeled off by the back-washing operations. However, it is necessary to increase the pressure difference for back-washing and to apply instantaneously such pressure as mentioned before when dust containing gas to be treated contains tar components and dust is of tacky.

The pressure difference for the back-washing, which is necessary to maintain the filtration pressure drop, i.e. the pressure difference between the inside and the outside of the filter tubes during dust trapping operations, to a stable level for a long term, is generally in the range of from 500 to 15,000 mmAq, which of course depends on conditions of use.

The minimum pressure difference for the back-washing to raise the filter tubes disposed at the upper portion is generally in the range of from 1,000 to 6,000 mmAq, which varies depending on the design of the structural elements.

In addition, it is likely that a force to expand the bellows 24 in its axial direction is added to the force for raising the filter tubes by applying the gas pressure for back-washing to the outer periphery of the bellows 24.

It is an object of the present invention to provide a structure in which fitting members to be attached to an end portion of a fragile ceramic tube which is adapted to an actual external force to thereby eliminate damage of a connecting portion at the end portion of the ceramic tube when works to assemble or disassemble the ceramic tube to a gas system is carried out.

It is another object of the present invention to provide a supporting structure for ceramic filter tubes in a filter system with back-washing facilities which capable of avoiding damage of an end portion of ceramic filter tubes and a connecting portion due to an impact stress caused by a sudden upward movement of the filter tubes by a force pushing up the filter tubes and an impact stress caused when the filter tubes fall.

It is another object of the present invention to provide a supporting structure for ceramic tubes in a gas system which has a suppressing means adapted to be against the force of pushing up the filter tubes; provides an excellent sealing properties between the tube support plates and tubes, and allows to easily put the ceramic tubes to the container or to easily remove them from the container.

In accordance with the present invention, there is provided a supporting structure for ceramic tubes in a gas system in which a plurality of stages of tube support plates are provided in a substantially horizontal manner in a container, and ceramic tubes are supported with their axial lines being substantially vertical between the vertically adjacent tube support plates so that at least a through hole formed in the tube support plates is communicated with the inner passages of the ceramic tubes, characterized in that metallic ring holders are respectively fitted to the outer periphery of the lower end portion of the tubes with interposed compacted layers while the metallic ring holders are in contact with the lower end faces of the tubes, and the ring holders are respectively in contact with and are supported by the tube support plates which are placed below the ring holders.

In a preferred embodiment of the present invention, metallic ring holders are respectively fitted to the outer periphery of the upper end portion of the tubes with interposed compacted layers while the metallic ring holders are in contact with the upper end faces of the tubes, and the ring holders are substantially supported by the upper tube support plates so as to be able to be displaced.

According to the present invention, there is provided a supporting structure for ceramic tubes in a gas system in which a plurality of stages of tube support plates are provided in a substantially horizontal manner in a container, and ceramic tubes are supported with their axial lines being substantially vertical between the vertically adjacent tube support plates so that through holes formed in each of the tube support plates are communicated with the inner passages of the ceramic tubes, characterized in that a receiving seats are provided at the peripheral edges of through holes in the lower tube support plates respectively, metallic ring bodies are respectively fitted to the outer peripheries of the lower end portion of the tubes with interposed compacted layers; the ring bodies are in contact with and are supported by the receiving seats which are provided at the peripheral edges of the through holes in the tube support plates which are placed below the ring bodies, and means for engaging the ring bodies with the tube support plates by turning the ring bodies together with the ceramic tubes, whereby the movement of the lower ends of the ceramic tubes is suppressed.

As another preferred embodiment of the present invention, the engaging means comprises a plurality of tongue portions projecting from the outer periphery of each of the ring bodies and a suppressing section formed in each of the receiving seat which is formed at the peripheral edges of the through holes in the tube support plates, and the suppressing section has notched portions opened upwardly so as to allow insertion of the tongue portions, whereby when the ring body is brought in contact with the peripheral edge of each of the through holes in the tube support plates and turned in the contacting state, the engaging means engages the tongue portions with the lower side of the suppressing section so as to suppress the tongue portions.

In a preferred embodiment of the present invention, an entirely continuous contacting portion and discontinuous contacting portions, which come to contact with the receiving seat, are formed at the outer periphery of each of the ring bodies so that the entirely continuous contacting portion is formed at the lower side of the outer periphery and the discontinuous contacting portions are formed above the entirely continuous contacting portion; an annular receiving portion which comes to contact with the entirely continuous contacting portion and a suppressing portion which comes to contact with the discontinuous contacting portions are formed at the inner periphery of each of the receiving seats so that the annular receiving portion is formed at the lower portion of the receiving seat and the suppressing section is formed above the annular receiving portion respectively; notched portions are formed in the suppressing section so that the discontinuous contacting portions of each of the ring bodies are inserted from the top and when the ring bodies are turned under the condition that the entirely continuous contacting portion is in contact with the annular receiving portion, the discontinuous contacting portions are engaged with the pressing section, and at least one contacting surface of the entirely continuous contacting portion and the annular receiving portion are formed to have a spherical surface, and at least one contacting surface of the discontinuous contacting portions and the suppressing section are formed to have a spherical surface.

In another preferred embodiment of the present invention, the spherical surface formed at at least one contacting surface of the entirely continuous contacting portion and the annular receiving portion and the spherical surface formed at at least one contacting surface of the discontinuous contacting portions and the suppressing section respectively have their centers at substantially the same place along the axial line of the tubes, and each of the centers is located above the upper edge portion of the contacting spherical surface formed between the entirely continuous contacting portion and the annular receiving portion and is located below the upper edge portion of the contacting spherical surface formed at the discontinuous contacting portions and the surpressing section. In this case, even though the tubes are inclined with respect to the tube support plates, the optimum fitting between the discontinuous contacting portions of the ring body and the suppressing section of the receiving seat can be maintained, and it is obtainable an effect of engagement almost without any stress in the tubes and against a force for raising the tubes. In another preferred embodiment of the present invention, the annular receiving portion and the suppressing section which are formed in the receiving seat respectively have conical surfaces, and the entirely continuous contacting portion and the discontinuous contacting portions which are formed in the ring bodies respectively have spherical surfaces.

In another preferred embodiment of the present invention, the contacting surface of the entirely continuous contacting portion and the annular receiving portion is a spherical surface, and the contacting surface of the discontinuous contacting portions and the suppressing portion is a spherical surface. In this case, setting accuracy can be easily obtained because mutually contacting surfaces are spherical, and the contacting surfaces are not easily damaged unlike the case that an edge is brought to contact with a spherical surface.

In a preferred embodiment of the present invention, the ring bodies are respectively ring holders which are in contact with the lower end faces of ceramic tubes to be supported.

In a preferred embodiment of the present invention, the compacted layers are constituted by a thermally expandable inorganic material and ceramic fibers as the major components.

In a preferred embodiment of the present invention, the ceramic tubes are gas-permeable porous filter tubes and the gas system is a filter system.

In a preferred embodiment of the present invention, the filter system has means for refreshing by backwashing.

The supporting structure for ceramic tubes according to the present invention is so constructed that an impact stress by displacement which is the major cause of the damage of the connecting portion for the ceramic tubes or an end portion of the ceramic tube is received as a compressive stress applied to an end face of the ceramic tube, by utilizing such nature that a fragile material such as ceramics is relatively durable to a compressing force and concentration of the stress is avoided. Namely, for instance, in a dust trapping system, when the ceramic filter tubes are suddenly moved in the upper direction by the pressure of back-washing gas or they fall subsequently, a strong force acts in their axial direction on the ring bodies attached to ends of the filter tubes.

Further, it is difficult to avoid a force of the axial direction applied to the end portion of the ceramic tubes when the works for attaching the ceramic tubes in the container or for removing them from the container. However, in accordance with the supporting structure for ceramic tubes of the present invention, since ring holders attached to the outer periphery of the end portion of the ceramic tubes are substantially engaged with the end surfaces of the ceramic tubes, the force applied to the ring holder in their axial direction functions as a pushing force applied between the ring holders and the flat end surfaces of the ceramic tubes, and there causes no substantial shear stress to the compacted layers disposed between the ring holders and the peripheral surface of the end portion of the ceramic tubes. Accordingly, the damage of the compacted layers disposed between the ring holder and the peripheral surface of the filter tubes can be prevented.

As a shock absorbing material for the compacted layer, any material can be preferably used as long as it does not lose elasticity at an elevated temperature. Addition of a material expandable by heat is further desirable to assure the tightness between the tubes and the ring bodies or between the tubes and the ring holders.

The most desirable example is to use a compacted layer constituted by ceramic fibers and a thermally expandable inorganic material such as vermiculite as the major components.

The fitting structure according to the present invention can prevent the end portion of the ceramic tubes or the connecting portions of the ceramic tubes from damaging by a shock applied to the end portion of the ceramic tubes or a member attached to the end portion during the works to attach the ceramic tubes, especially fragile gas-permeable porous ceramic filter tubes to the container or to remove them from the container.

Various types of structure in a dust trapping system in which the outer periphery of an end portion of the ceramic tubes is held by a metallic ring body have been proposed. However, the construction of a ring holder in which a part of the ring body is engaged with an end face of the ceramic tube is not known.

It is considered that the conventional supporting structure has aimed at only supporting the dead weight of the ceramic tubes.

In accordance with another embodiment of the present invention, the ceramic tubes are inserted in the container in a mutually communicating state through a through hole formed in the tube support plate at the uppermost stage in the container; ring holders attached to the end portions of the respective ceramic tubes are brought to contact with the peripheral edge of a through hole of the corresponding tube support plates to thereby support the ceramic tubes, and the ring holders are turned together with the ceramic tubes under the contacting state, whereby the ring holders are engaged with the tube support plates.

In a preferred embodiment of the supporting structure for ceramic tubes in accordance with the present invention, an entirely continuous contacting portion formed at the outer periphery of the lower portion of each of the ring bodies comes to contact with an annular receiving portion formed at the inner periphery of the lower portion of each of receiving seats after the ring bodies are put onto the receiving seats, whereby the tubes can be stably supported and the spaces defined by the tube support plates in the vertical direction can be sealingly separated. In this case, since at least one contacting surface of the entirely continuous contacting portion and the annular receiving portion of the receiving seat has a spherical surface, regularity can be maintained even through the tubes are disposed with their axes slightly inclined with respect to the tube support plates, and excellent sealing properties can be obtained. When the ring bodies are turned together with the tubes under the condition that the entirely continuous contacting portion is in contact with the annular receiving portion, the discontinuous contacting portions projecting from the outer periphery of the ring bodies enter into the inside of non-cut portions from the cut portions which are formed above the annular receiving portion, whereby the suppressing section is engaged with the upper side of the discontinuous contacting portions. Accordingly, displacement of the tubes can be suppressed against a force for raising upwardly which is caused by a gas pressure in the back-washing operation.

Even in this case, since at least one contacting surface of the discontinuous contacting portions of the ring bodies and the suppressing section of the ring seats are formed to have a spherical surface, a slight inclination of the tubes with respect to the tube support plates can be accommodated. It is because the discontinuous contacting portions fittingly enter the inside of the non-cutting portion so that it is prevented from raising upwardly.

Thus, by such simple operation that the tubes which are previously connected are descended through the upper through hole and the ring bodies attached to the respective tubes are turned under the condition that they are in contact with the receiving seats which correspond to the respective tube support plates, the tubes can be supported so as not to move upwardly against a force for raising the tubes upwardly while excellent sealing properties can be maintained between the tubes and the tube support plates. In a case that the tubes such as the filter tubes are arranged in a substantially vertical direction so that they are connected to each other in a multi-stage by means of the tube support plates, it is desirable that the supporting structure for tubes according to the present invention is generally applied to the lower end portion of the tubes. However, the supporting structure for the lowermost tube may be omitted because there is no possibility of raising of the lowermost tube by the gas pressure for the back-washing.

Although description has been made as to use of porous ceramic filter tubes for the several embodiment of the present invention, the present invention can be preferably utilized as a supporting structure for tubes in a heat exchanger which treats a high temperature fluid in which ceramic tubes are used.

Thus, in a high temperature gas system, especially a dust trapping system, it can be easy to assemble the ceramic tubes, especially fragile porous ceramic filter tubes in the container or to disassemble them from the container.

Further, the damage of the ceramic tubes or the filter tubes, or the leakage of gas during the back-washing operation in the dust trapping system can be prevented by suppressing the vertical movement of the tubes or the filter tubes to thereby improve reliability of the system.

In the drawings:

FIG. 2 is in enlarged longitudinal cross-sectional view partly omitted showing an important part of the supporting structure as shown in FIG. 1;

FIG. 3 is a cross-sectional view partly omitted of another embodiment of the supporting structure for ceramic tubes according to the present invention;

Preferred embodiments of the present invention will be described with reference to the drawings.

Figure 1:
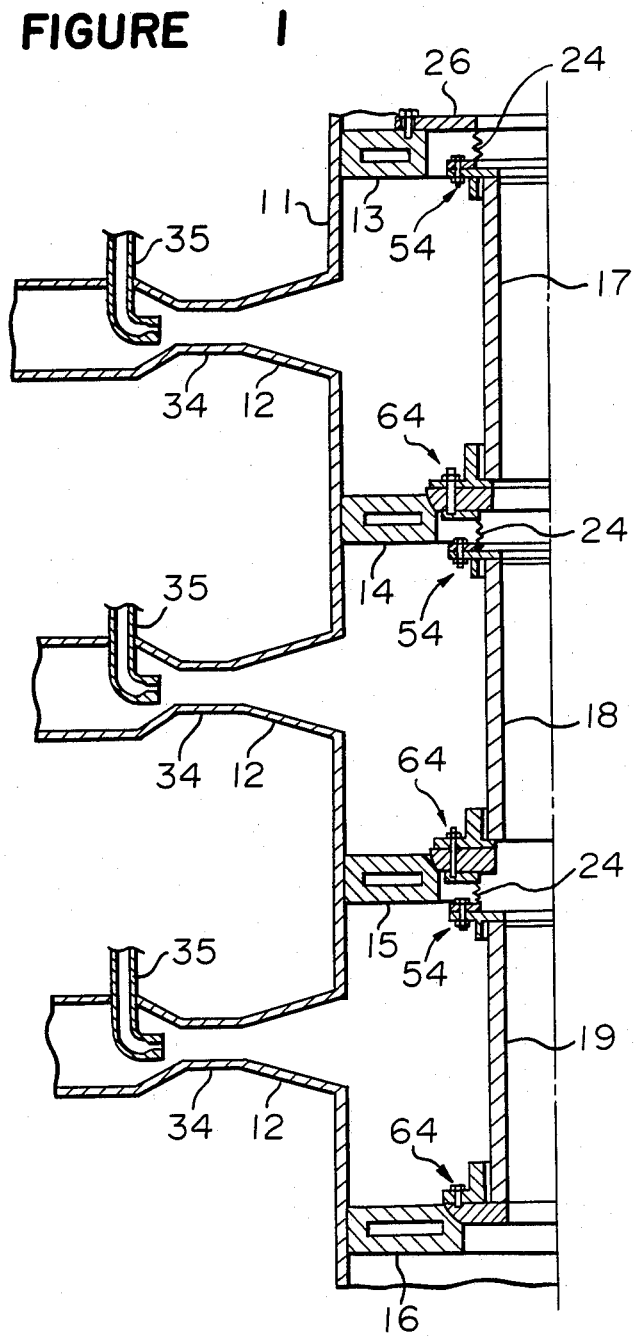
FIG. 1 is a longitudinal cross-sectional view partly omitted of an embodiment of a filter system in which a supporting structure for ceramic tubes according to the present invention is used.
Figure 4:
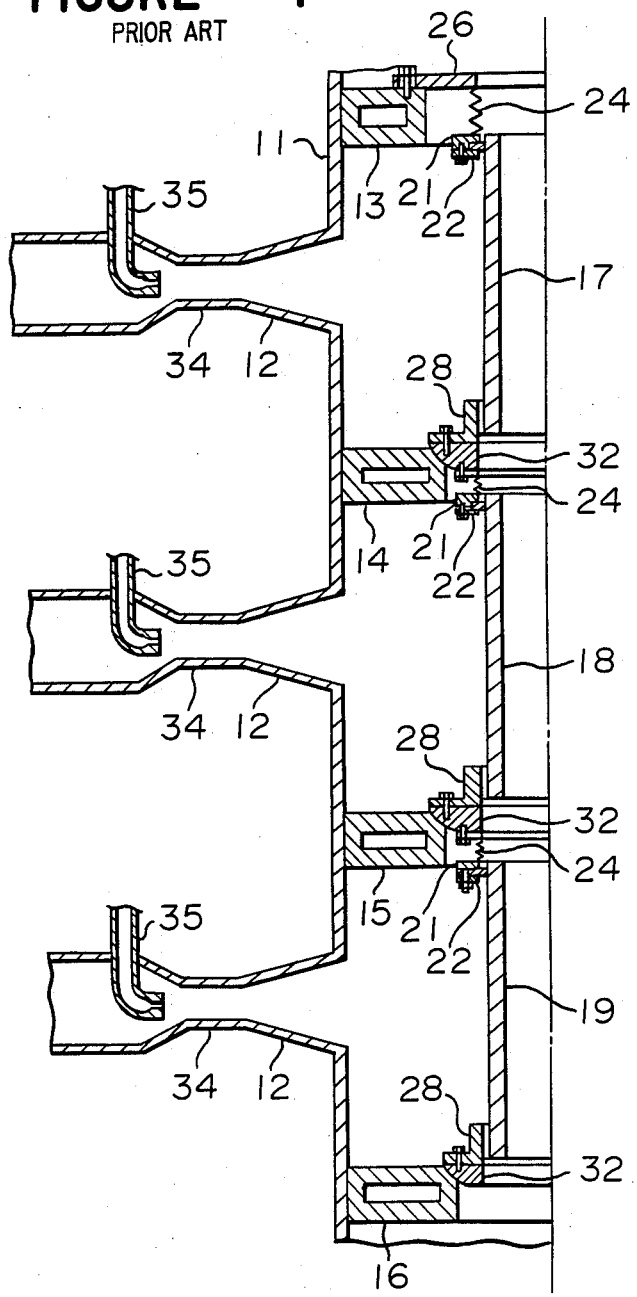
FIG. 4 is a longitudinal cross-sectional view partly omitted of a filter system in which a conventional supporting structure for ceramic filter tubes is used.
Figure 5:
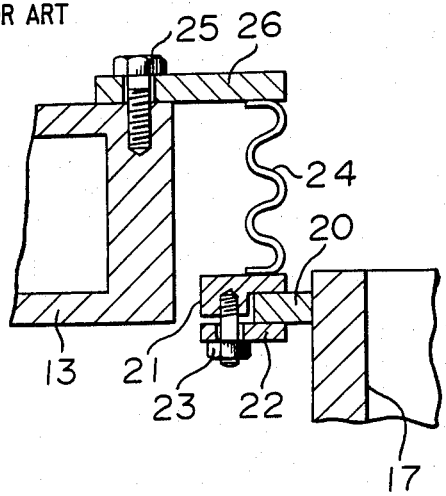
FIG. 5 is a cross-sectional view partly omitted of the supporting structure for the upper end portion of a ceramic filter tube in the filter system as shown in FIG. 4.
Figure 6:
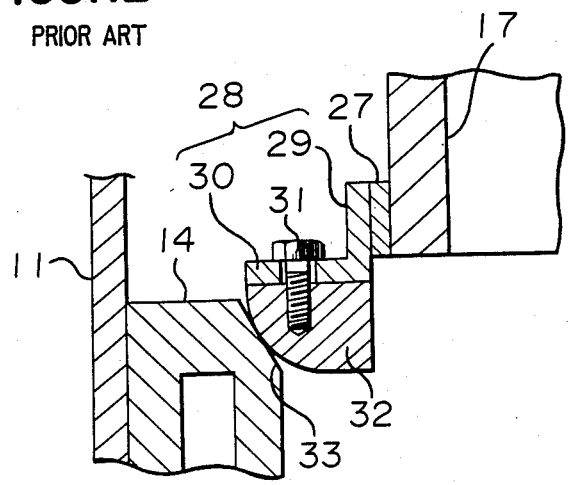
FIG. 6 is a cross-sectional view partly omitted of the supporting structure for the lower end portion of a ceramic filter tube in a filter system as shown in FIG. 5.
Figure 7:
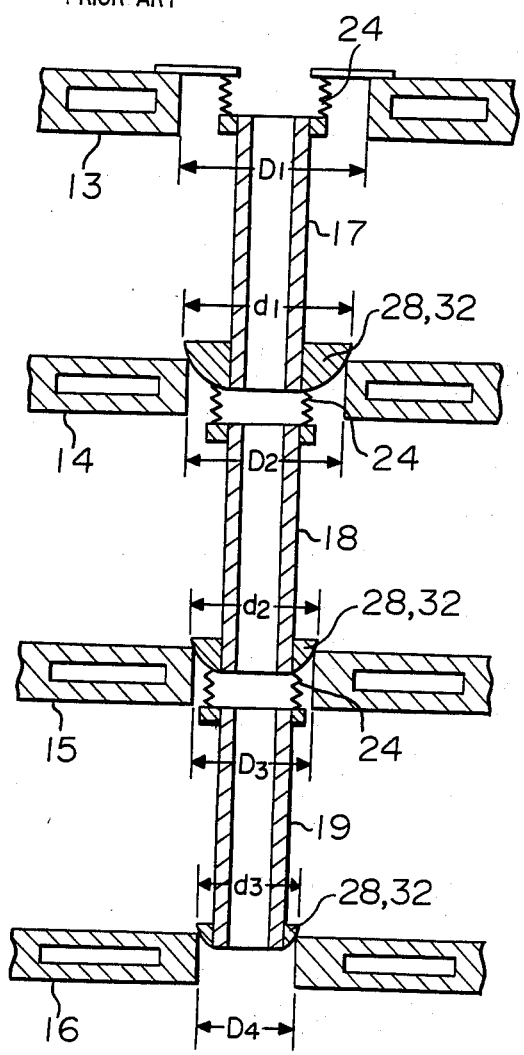
FIG. 7 is a cross-sectional view showing diagrammatically the supporting structure for ceramic filter tubes in a conventional filter system.

FIGS. 1 and 2 show an embodiment of the supporting structure for ceramic tubes of the present invention which is used for a supporting structure for ceramic filter tubes in a filter system.

In the FIGURES, the same or corresponding elements of the conventional supporting structure as shown in FIGS. 4 to 8 are designated by the same reference numerals, and description of these elements is omitted.

As shown in FIG. 1, the overall structure of the filter system is similar to the conventional system shown in FIGS. 4 to 8 in which the tube support plates 13, 14, 15, 16 are arranged in a multi-stage in the container 11 in a substantially horizontal manner; gas-permeable porous ceramic filter tubes 17, 18, 19 are receptively arranged between these tube support plates, and these filter tubes 17, 18, 19 are respectively supported by the tube support plates at the positions of the through holes of the tube support plates so as to be communicated with each other in the vertical direction. As an example, the supporting structure for the filter tube 18 will be described. As shown in FIG. 2, a ring holder 54 comprising ring members 51, 52, 53 is fitted to the upper end portion of the filter tube 18. In this case, the ring member 51 is constituted by a cylindrical portion 51a and a flange portion 51b, and the cylindrical portion 51a is mounted on the outer periphery of the upper end portion of the filter tube 18 with an interposed compacted layer 55 which is constituted by a thermally expandable inorganic material and ceramic fibers.

Each of the ring members 51, 52, 53 is secured to each other by fastening bolts 56.

The ring member 52 is so formed as to project from the inner circumference of the ring member 51 so that it is in contact with the upper end face of the filter tube 18, whereby the ring holder 54 is engaged with the upper end face of the filter tube 18 by means of the ring member 52.

The lower edge portion of a metallic bellows 24 is connected to the upper surface of the ring member 53 of the ring holder 54. With the bellows 24, the filter tube 18 can be moved in the axial direction (in the vertical direction) and a gas-tight communication of the filter tube 18 with the filter tube 17 located above can be maintained.

More detailed description will be made as to the compacted layer 55. The compacted layer 55 is preferably formed into, for instance, a mat sheet by binding the thermally expandable inorganic material such as vermiculite, pearlite and so on and ceramic fibers constituted by alumina and silica as the major component, with use of organic or inorganic binder. The compacted layer expands mainly in the radial direction of the filter tube 18 by heating it at a temperature of, for instance, 400° C. or higher, whereby the outer periphery of the upper end portion of the filter tube 18 is firmly connected to the cylindrical portion 51a of the ring member 51.

The compacted layer functions to absorb the difference in thermal expansion between the ring member 51 made of metal and the filter tube 18 made of ceramics.

In the present invention, the compacted layer is, of course, not limited to the material as mentioned above, and any material may be used as long as it can secure the ring holder; can absorb the difference of thermal expansion and has heat resistance properties.

A ring holder 64 comprising a ring member 61, a ring seat 62 and a ring member 63 is fitted to the lower end portion of the filter tube 18. The ring member 61, the ring seat 62 and the ring member 63 are connected to each other by fastening bolts 65. The ring member 61 is provided with a cylindrical portion 61a and a flange portion 61b, and the flange portion 61b is so formed as to radially project inwardly and outwardly so that it has a T-shape in cross section with respect to the cylindrical portion 61a. The inwardly projecting flange portion is in contact with the lower end face of the filter tube 18. The cylindrical portion 61a of the ring member 61 is firmly mounted on the outer periphery of the filter tube with an interposed compacted layer 66 consisting of the thermally expandable inorganic material and the ceramic fibers as described before. On the other hand, an upwardly opened, tapered seat 15a is formed at a peripheral edge of a through hole formed in the tube support plate 15 which is located below the filter tube 18.

The ring seat 62 of the above-mentioned ring holder 4 has a circumferential portion constituted by a spherical surface which has its center on the axial line of the filter tube 18, and the ring seat 62 is in contact with the tapered seat 15a of the tube support plate 15 in a portion of the spherical surface. Thus, the lower end portion of the filter tube 18 is in contact with and supported by the tube support plate 15 by means of the ring holder 64. Since the contact between the ring seat 62 of the ring holder 64 and the tapered seat 15a of the tube support plate 15 is performed by the contact between a spherical surface and a tapered surface, an excellent sealing effect can be obtained at the contacting portion. Further, an excellent sealing effect and supporting condition can be obtained even though the filter tube 18 is more or less inclined from the vertical position with respect to the tube support plate 15.

the upper edge portion of a metallic bellows 24 is connected to the lower surface of the ring member 63 of the ring holder 64. The bellows 24 functions to connect in a gas-tight manner the lower end portion of the filter tube 18 to a ring holder attached to the upper end of the filter tube 19 which is located below the filter tube 18.

Similarly, a metallic bellows 24 connected to the upper end portion of the above-mentioned filter tube 18 is connected to the ring member 63 of the ring holder 64 which is fitted to the filter tube 17 located above the filter tube 18.

Thus, the filter tubes 17, 18, 19 are connected so as to be communicated with each other in a gas-tight manner by means of the bellows 24 so that an amount of displacement in the axial direction which is caused by a thermal expansion difference and so on can be absorbed.

The upper edge portion of the bellows 24 attached to the upper end portion of the filter tube 17 is connected to a flange-like supporting piece 26 which is attached to the tube support plate 13.

Dust trapping operations in the above-mentioned filter system is carried out in the same manner a the system described with reference to FIGS. 4 to 8. Accordingly, description of the operations is omitted. However, in back-washing operations, there sometimes causes a problem as follows. A filter tube located above the section between two adjacent tube support plates which is subjected to the back-washing operations is instantaneously raised by the pressure of gas for back-washing. When the filter tube is raised, a strong force is applied to the ring holder 54 in its axial direction since the bellows 24 fixed to the upper end portion of the filter tube located above the section subjected to the back-washing is instantaneously compressed. However, the supporting structure of the present invention is so constructed that the ring member 52 of the ring holder 54 is in contact with and in engagement with the upper end face of the filter tube, so that the force substantially acts as a stress of compression on the upper end face of the filter tube. Accordingly, a shear stress acting on the compacted layer disposed between the cylindrical portion 51a of the ring member 51 and the filter tube is extremely diminished, and therefore, the damage of the compacted layer 55 due to the shear stress is avoidable.

Further, even when the upper end portion of a filter tube strikes the tube support plate located above, the damage of the upper end portion of the filter tube is avoidable because the upper end face of the filter tube is protected by the ring holder 54 which is in contact with and in engagement with the upper end face of the filter tube.

The same description can be applied to the ring holder 64 fitted to the lower end portion of the filter tube. Namely, gas for back-washing is generally blown as a pulse current. Therefore, when the pressure of the as for back-washing at the lower section is not appropriate, the filter tube may be instantaneously raised, and subsequently fall. In the falling of the filter tube, the ring seat 62 of the ring holder 64 which holds the lower end portion of the filter tube receives a large shock by hitting the lower tube support plate, whereby a strong shock is applied to the ring holder 64 in its axial direction. However, the filter system of this embodiment is so constructed that the flange portion 61b of the ring member 61 of the ring holder 64 is in contact with and in engagement with the lower end face of the filter tube 18. Accordingly, the shear stress does not substantially act on the compacted layer 66 disposed between the cylindrical portion 61a of the ring member 61 and the filter tube 18, and therefore the damage of the compacted layer 66 is avoidable. Further, the damage of the lower end portion of the filter tube 18 is also avoidable in the same manner as the above.

In these case, it is preferable that the both contacting surfaces of ring holders and end faces of the filter tubes are flat. Accordingly, the compressive stress between them is not concentrated. FIG. 3 shows another embodiment of the ring holder attached to the upper end portion of the filter tube. In this embodiment, a ring holder 73 comprising ring members 71, 72 is fitted to the upper end portion of, for instance, the filter tube 18. The ring members 71, 72 are connected to each other by fastening bolts 74. The ring member 71 has a cylindrical portion 71a and a flange portion 71b. The flange portion 71b has portions projecting inwardly and outwardly in the radial direction so that the ring member 1 has a T-shape in cross section. The portion projecting inwardly of the flange portion 71b is in contact with and in engagement with the upper end fce of the filter tube 18. The cylindrical portion 71a is mounted on the outer periphery of the filter tube 18 with an interposed compacted layer 75 formed by the thermally expandable inorganic material and the ceramic fibers which are described before.

In this embodiment, the same effect as the above-mentioned embodiments can be obtained by making the flange portion 71b of the ring member 71 contact with the upper end face of the filter tube 18.

The filter system in the above-mentioned embodiment has such structure that the filter tubes are connected to each other to form a plurality of stages. However, the present invention is applicable to a case that a container has a single section defined by vertically arranged two tube support plates between which a plurality of ceramic tubes are arranged. Namely, even in the case that the ceramic tubes are arranged in the container without connecting the tubes in the vertical direction, is necessary to support the ceramic tubes so as to permit an amount of displacement in the axial direction so that a difference of thermal expansion between the ceramic tubes and the container made of metal in their axial direction can be absorbed.

Further, when a ceramic tube are assembled or disassembled during, for instance, maintenance works, it is avoidable to damage the tube by utilizing the supporting structure of the present invention when a shock is applied to an end of a ceramic tube.

In the above-mentioned embodiments, the ring holders are directly in contact with the end faces of the filter tubes. However, a packing or another suitable element may be interposed between the ring holder and the end face of the filter tube.

In the embodiment as shown in FIG. 2, the bellows 24 with the ring member 63 at its upper end and the ring member 53 at its lower end is arranged between the ring seat 62 and the ring member 52. However, the bellows may be attached to just below the filter tube and just above the tube support plate. Specifically, the bellows 24 with the ring member 63 at its upper end and the ring member 53 at its lower end is connected between the ring member 61 and the ring seat 62 wherein the ring seat 62 is directly connected to the ring member 52.

Figure 9:
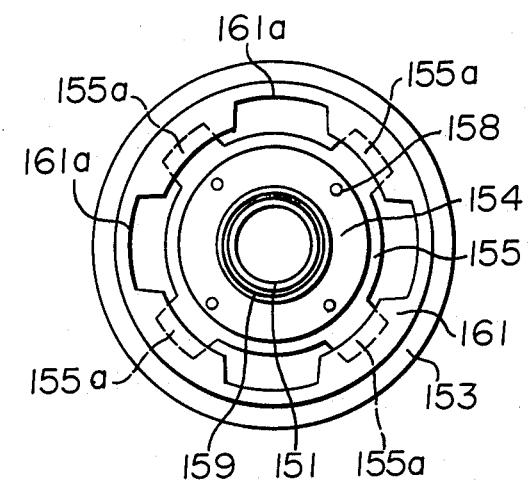
FIG. 9 is a plane view of an embodiment of the supporting structure for ceramic tubes of the present invention.
Figure 8:
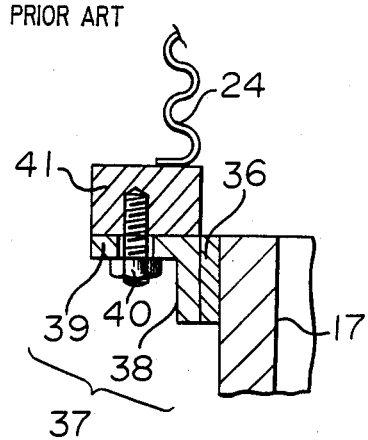
FIG. 8 is a cross-sectional view partly omitted showing another example of a supporting structure for the upper end portion of a ceramic filter tube in a conventional filter system.
Figure 10:
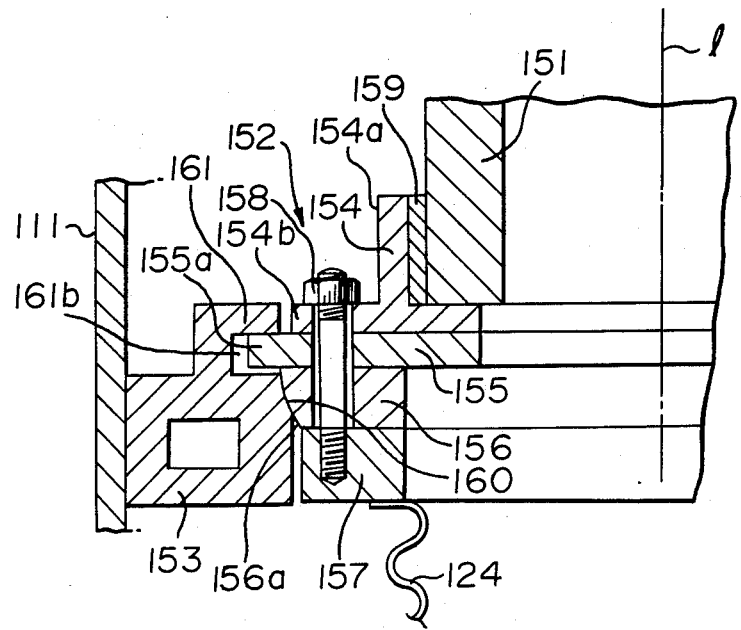
FIG. 10 is an enlarged longitudinal cross-sectional view of the supporting structure as shown in FIG. 9.

FIGS. 9 and 10 show another embodiment of the supporting structure for ceramic tubes in a gas system according to the present invention.

In this embodiment, a ring holder 152 fitted to the lower end portion of a ceramic tube is in contact with a receiving seat 160 formed in the corresponding tube support plate 153 so that the ceramic tube is supported by and engaged with the tube support plate.

In the following description, substantially the same effect of the present invention can be obtained even with the ring body which is not contact with an end face of a ceramic tube.

In the following, the supporting structure of this embodiment will be described with reference to figures in which the supporting structure is used for a filter system.

A gas-permeable porous ceramic filter tube 151 is in contact with and supported by a receiving seat 160 formed in a tube support plate 153 arranged in a container 111 by means of the ring holder 152 fitted to the lower end portion of the filter tube 151.

The ring holder 152 comprises ring members 154, 155, a ring seat 156 and a ring member 157.

The ring member 154 has a cylindrical portion 154a and a flange portion 154b. The cylindrical portion 154a is mounted on the outer periphery of the lower end portion of the filter tube 151 with an interposed compacted layer 159 which is formed by a thermally expandable inorganic material and ceramic fibers.

The flange portion 154b has portions projecting outwardly and inwardly in the radial direction, and the portion projecting inwardly is in contact with and in engagement with the lower end face of the filter tube 151.

The ring member 155 has four tongue portions 155a projecting out from its periphery.

As a preferred example, the ring seat 156 has a circumferential portion 156a which is constituted by a spherical surface having its center on the axial line l of the filter tube 151.

Further, a receiving seat 160 having the same spherical surface as that of the ring seat 156 is formed in the tube support plate 153, and the spherical surface 156a of the ring seat 156 is in contact with and supported by the receiving seat 160.

Since the circumferential portion 156a of the ring seat 156 is constituted by a spherical surface having its center on the axial line l of the filter tube 151, the circumferential portion 156a of the ring seat 156 is in close-contact with the receiving seat 160 of the tube support plate 53 with good sealing effect and the filter tube 151 is firmly supported even though the filter tube 151 is more or less inclined from the vertical position with respect to the tube support plate 153 due to dimensional errors in the tube support plate, the filter tube, the supporting member and so on.

However, it is not always necessary for the circumferential portion 156a of the ring seat 156 to have the spherical surface as described above. And it may be constituted by a tapered face or it may have a corner portion depending on the surface condition of the receiving seat. Further, chamfering or rounding process may be used for the seat.

Further, it is not always necessary for the receiving seat 160 to have a spherical surface or a tapered surface, and it may have a corner portion depending on the surface condition of the ring seat combined therewith. In addition, the upper edge portion of the bellows 124 is connected to the lower face of the ring member 157. The lower edge portion of the bellows 124 is connected to a ring holder fixed to the upper end portion of the lower filter tube.

A suppressing section 161 is formed at the peripheral edge of the through hole of the tube support plate 153 so as to correspond to tongue potions 155a of the ring member 155.

The suppressing section 161 is provided with notched portions 161a which allows insertion of the tongue portions 155a when viewed from the above as shown in FIG. 9. Namely, when the ring holder 152 is lowered to the tube support plate 153, the tongue portions 155a are inserted through the notched portions 161a.

The suppressing section 161 formed integrally with the tube support plate is formed in a ]-like shape in vertical cross-section. Accordingly, when the ring holder 152 is turned together with the ceramic tube while it is in contact with the tube support plate 153, the tongue portions 155a are inserted in the ]-like retaining groove 161b.

In this embodiment having four tongue portions, an angle of turning is determined to be about 45°. However, the angle of turning can be changed depending on the number of tongue portions.

Thus, in assembling of the ceramic tubes in the container by using the supporting structure for the ceramic tubes of the present invention, the filter tube 151 is first inserted in the container through the through hole of the upper tube support plate of the container 111 until the ring holder 152 fitted to the lower end portion of the filter tube 151 comes in contact with the tube support plate 153. At the same time, the tongue portions 155a of the ring member 155 are inserted through the notched portions 161. Thus, the lower end portion of the filter tube 151 is supported by bringing the circumferential portion 156a of the ring seat 156 of the ring holder 152 into contact with the receiving seat 160 formed at the tube support plate 153. In this case, the filter tube 151 may be more or less inclined from the vertical position with respect to the tube support plate 153. However, since the circumferential portion 156a of the ring seat 156 is formed to have a spherical surface having its center on the axial line l of the filter tube 151, the circumferential portion 156a comes fittingly in close-contact with the receiving seat 160, and a reliable supporting structure with good sealing effect can be obtained.

Then, by turning the filter tube 151, after the ring holder 152 has been supported by the tube support plate 153, the ring holder 152 is turned along with the filter tube 151, whereby the tongue portions 155a of the ring member 155 are inserted in the ]-like retaining groove 161b of the suppressing section 161; thus, a state as shown in FIGS. 9 and 10 is obtainable.

Accordingly, generation of a pressure difference of gas during, for instance, back-washing operations tends to raise the filter tube 151. However, the presence of the suppressing section 161 which extends above the tongue portions 155a of the ring member 155 suppressed filter tube 151 to be raised. Thus, the movement of the filter tube 151 in the axial direction (vertical direction) and as a result of the raising of the filter tube i.e. the falling of it can be prevented, and the compacted layer 159 interposed between the end portion of the filter tube 151 and the ring holder 152 can be prevented from impairing.

It is not essential that the suppressing section 161 is in close-contact with the upper surfaces of the tongue portions 155a when the tongue portions 155a are inserted in the ]-like retaining groove 161b of the suppressing section 161. It may be so constructed that the suppressing section 161 extends above the tongue portions 155a with a slight gap. In this case, the object of the present invention can generally be accomplished when the gap is determined to be within 1.5 mm. Namely, the moving speed of the filter tube is sufficiently small even when the filter tube is raised within that range, and a large impact does not given to the structural elements.

Figure 11:
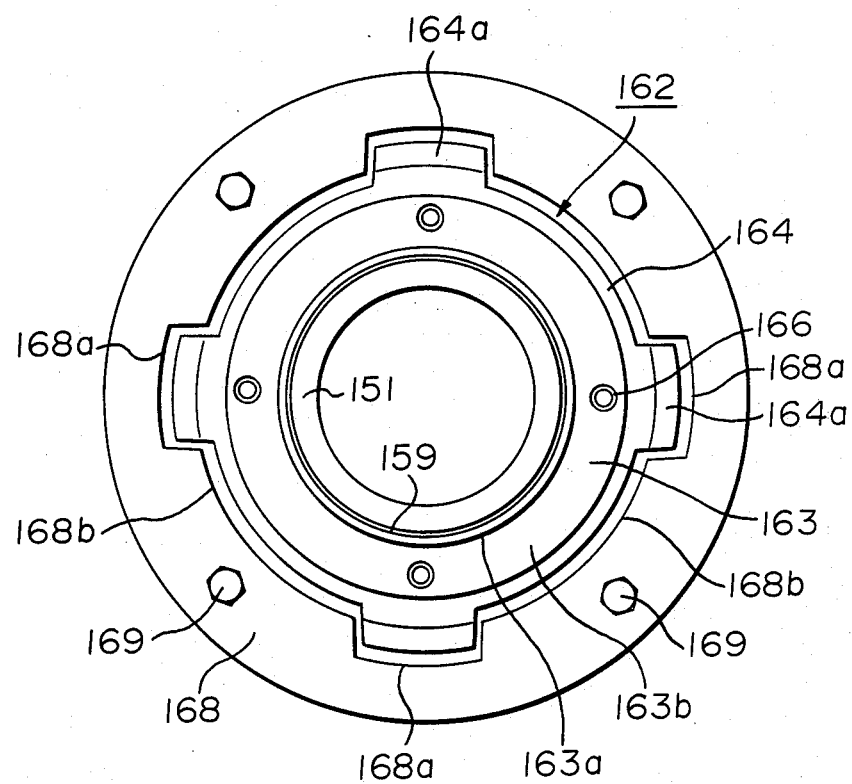
FIG. 11 is a plane view of another embodiment of the supporting structure for ceramic tubes according to the present invention.
Figure 12:
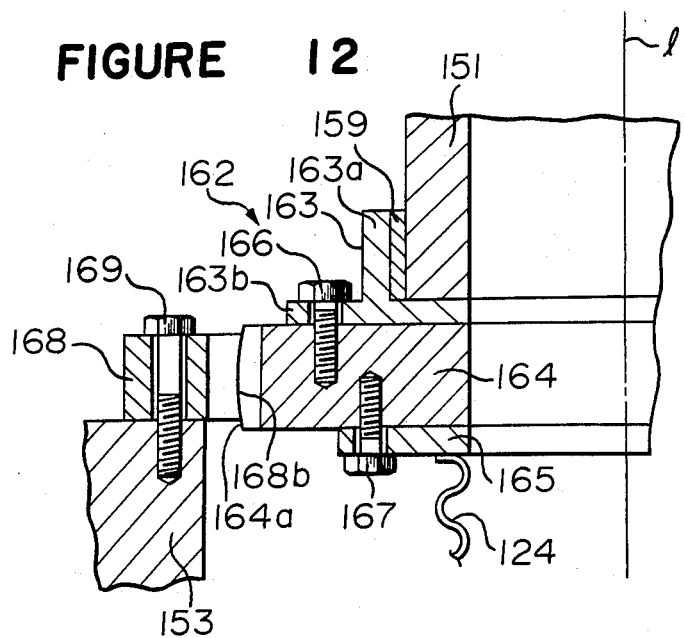
FIG. 12 is an enlarged longitudinal cross-sectional view of the supporting structure as shown in FIG. 11.

FIGS. 11 and 12 show another embodiment of the supporting structure for ceramic tubes according to the present invention.

The same or corresponding parts as in FIGS. 9 and 10 are indicated by the same reference numerals and therefore, description of these parts is omitted. In this embodiment, a ring holder 162 is fitted to the lower end portion of the filter tube 151. The ring holder 162 is constituted by three ring members 163, 164, 165 which are connected together by bolts 166, 167.

The upper ring member 163 comprises a cylindrical portion 163a and a flange portion 163b. The cylindrical portion 163a is engaged with the outer periphery of the lower end portion of the filter tube 151 through the same interposed compacted layer 159 as described before. The flange portion 163b projects inwardly and outwardly from the cylindrical portion 163a in its radial direction, and the portion projecting inwardly is in contact with the lower end face of the filter tube 151 to be engaged with it.

The intermediate ring member 164 has four tongue portions 164a projecting from the outer periphery. The circumferential surface of the tongue portions 164a is formed to have a spherical surface having its center on the axial line l of the filter tube 151.

The upper edge portion of the bellows 124 is connected to the lower surface of the lower ring member 165. The lower edge portion of the bellows 124 is connected to a ring holder fixed to the upper end portion of a filter tube (not shown) arranged below the filter tube 151. A receiving seat member 168 is attached to the tube support plate 53 at a position near the through hole by means of bolts 169 so that the receiving seat member 168 supports the ring holder 162. The receiving seat member 168 has notched portions 168a so as to correspond to the tongue portions 164a of the intermediate ring member 164 at its upper portion as shown in FIG. 11. Accordingly, the tongue portions 164a can be inserted through the notched portions 168a from the upper side. A retaining groove 168b having a spherical concave face, to which the circumferential portion of the tongue portions 164a of the intermediate ring member 164 is engaged, is formed in the inner circumferential portion of the receiving seat member 168 excluding the notched portions 168a.

In the supporting structure for filter tubes in this embodiment, the filter tube 151 is descended into the container (not shown) from the upper side until the intermediate ring member attached to the lower end portion of the filter tube is inserted in the retaining groove 168b of the receiving seat member 168 which is formed at the peripheral edge of the through hole of the tube support plate 153. At the same time, the tongue portions 164a of the intermediate ring member 164 can be inserted through the notched portions 168a of the receiving seat member 168. In this state, the ring holder 162 is turned together with the filter tube 151 so that the circumferential portion of the tongue portions 164a of the intermediate ring member 164 is inserted in the retaining groove 168b of the receiving seat member 168.

Since the circumferential portion of the tongue portions 164a is formed to have a spherical surface having its center on the axial line l of the filter tube 51, and the retaining groove 168b of the seat member 168 is formed to have a spherically concaved surface which is fitted to the circumferential portion of the tongue portions 164a, the circumferential portion of the tongue portions 164a comes in close-contact with the inner rence of the retaining groove 168b to thereby support and engage the lower end portion of the filter tube 151.

The construction of this embodiment enables to support the filter tube 151 by fittingly engaging the circumferential portion of the tongue portions 164a with the retaining groove 168b of the receiving seat member 168 so that movement of the filter tube 151 in the axial direction (vertical direction) can be suppressed even though the filter tube 151 is more or less inclined from the vertical position with respect to the tube support plate 153. Thus, this embodiment accomplishes the same effect as the above-mentioned embodiments.

Figure 13:
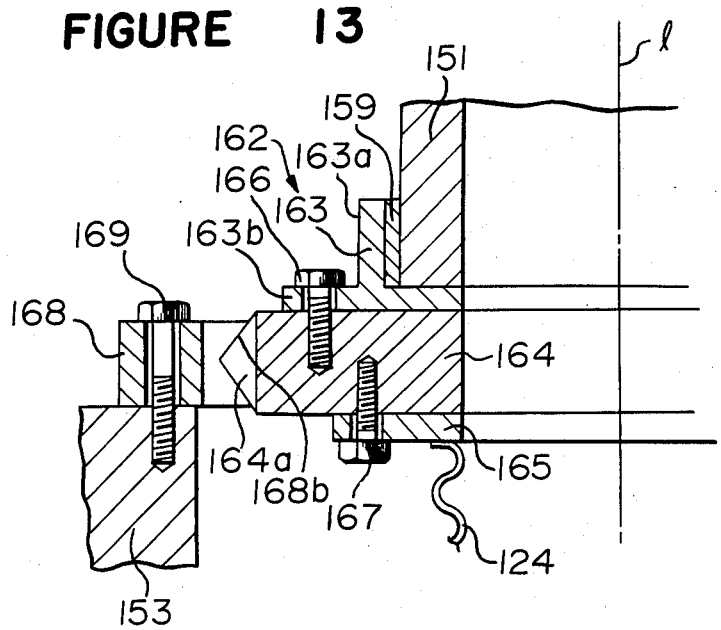
FIG. 13 is an enlarged longitudinal cross-sectional view of another embodiment of the supporting structure according to the present invention.

FIG. 13 shows still another embodiment of the supporting structure for ceramic tubes according to the present invention.

The supporting structure of this embodiment is analogeous to the embodiment as shown in FIGS. 11 and 12 except that the shape of the circumferential portion of the tongue portions 164a of the ring member 164 and the shape of the retaining groove 168b of the receiving seat member 168 are different. Namely, the tongue portions 164a of the intermediate ring member 164 is formed to have a triangle in cross section taken in the vertical direction, and the retaining groove 168b of the receiving seat member 168 is formed to have a V-like shape in cross section taken in the vertical direction so as to fit to the tongue portions 164a. Thus, by turning the ring holder 162, the circumferential portion of the tongue portions 164a are inserted into the retaining groove 168b, whereby the lower end portion of the ceramic tube 151 is supported by means of ring holder 162 so that movement of the ceramic tube in the axial direction (vertical direction) is suppressed.

Various kinds of shape can be used for the engaging portion between the circumferential portion of the tongue portions 164a and the retaining groove 168b of the receiving seat member 168. An inverse relation in combination of a convex and concave may be used.

Figure 19:
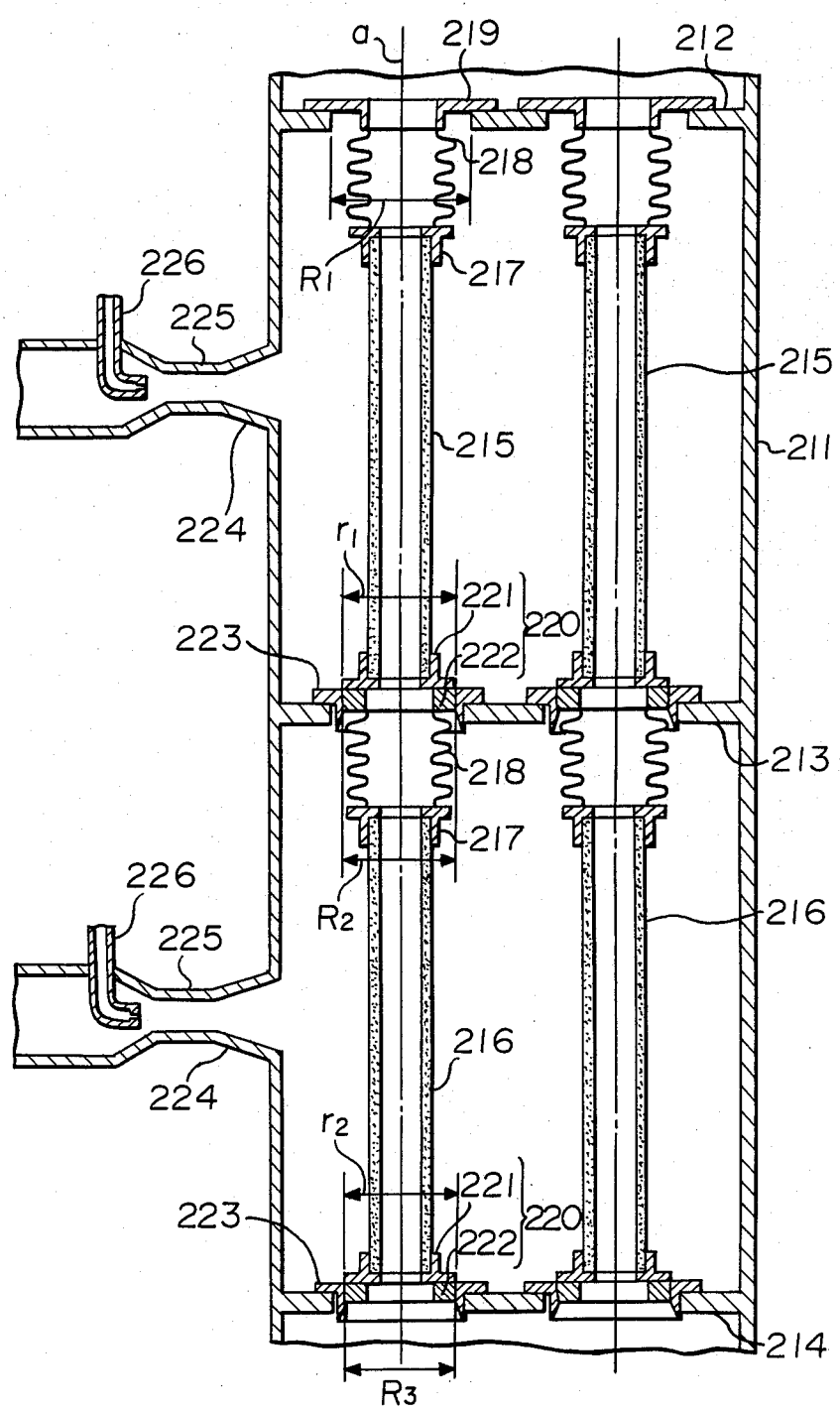
FIG. 19 is a longitudinal cross-sectional view of another embodiment of the supporting structure according to the present invention.

FIG. 19 shows an example in which the supporting structure for ceramic tubes of the present invention is applied to a filter system.

In FIG. 19, an inlet for dust-containing gas is formed in the upper side of the container 211 through a header and a dust hopper is formed at the lower side of the container 211 even though they are not shown in the FIGURE. In this embodiment, three metallic tube support plates 212, 213, 214 are attached to the inside of the container 211 so as to be substantially horizontal with predetermined intervals in the vertical direction so that an upper section defined by the tube support plates 212, 213 and a lower section defined by the tube support plates 213, 214 are respectively formed.

In the upper and lower sections, ceramic filter tubes 215, 216 are respectively arranged with their axial lines being vertical so that corresponding upper and lower filter tubes 215, 216 are respectively communicated with each other and are supported by and engaged to the tube support plates at predetermined positions. A metallic ring holder 217 is fitted to the outer periphery of the upper end portion of the upper filter tube 215 with an interposed compacted layer (not shown) made of a material such as a thermally expandable mat. The lower edge portion of a metallic bellows 218 is connected to the ring holder 217.

The upper edge portion of the bellows 218 is connected to a metallic flange 219 which is, in turn, engaged with a periphery of a through hole of the tube support plate 212.

On the other hand, a metallic ring holder 220 is fitted to the outer periphery of the lower end portion of the filter tube 215 with the interposed compacted layer (not shown) which is the same as mentioned above. The ring holder 220 comprises a ring member 221 for holding the outer periphery of the filter tube 215 and a base seat 222 attached to the lower face of the ring member 221, and the outer circumference of the base seat 222 is formed to have a spherical surface having its center on the axial line of the filter tube 215.

A receiving seat member 223 made of metal is attached to the periphery of the through hole of the tube support plate 213, and the inner circumference of the receiving seat member 223 is formed to have a spherical surface which is in agreement with the outer circumference of the base seat 222 so that the outer periphery of the base seat 222 having the spherical surface comes to be in contact with the inner circumference of the receiving seat member 223. The metallic ring holder 217 and the metallic bellows 218 are respectively attached to the outer periphery of the upper end portion of the lower filter tube 216 in the same manner as described with reference to the filter tube 215. The upper edge portion of the bellows 218 is connected to the base seat 222 attached to the lower end portion of the filter tube 215.

The ring holder 220 is attached to the outer periphery of the lower end portion of the filter tube 216 in the same manner as described with reference to the filter tube 215. The outer circumference of the base seat 222 of the ring holder 220 having the spherical surface comes to be in contact with the inner circumference of the receiving seat member 223 which is attached to the circumferential edge of the through hole of the tube support plate 214.

The supporting structure of this embodiment is so constructed that when the inner diameter of the through hole of the tube support plate 212 is represented by $R_1$, the outer diameter of the ring holder 220 fitted to the lower end portion of the filter tube 215 is represented by $r_1$, the inner diameter of the receiving seat 223 of attached to the tube support plate 213 is represented by $R_2$, the outer diameter of the ring holder 220 fitted to the lower end portion of the filter tube 216 is represented by $r_2$ and the inner diameter of the receiving seat 223 attached to the tube support plate 214 is represented by $R_3$, a relation of $R_1 > r_1 > R_2 > r_2 > R_3$ is satisfied. With such construction, for instance, the filter tubes 215 and 216 can be installed as follows. The receiving seats 223 are previously fixed to the tube support plates 213, 214 and the flange 219, the bellows 218, the ring holder 217, the filter tube 215, the ring holder 220, the bellows 218, the filter tube 216 and the ring holder 220 are sequentially connected in this order. Then, the filter tube 216 is inserted through the through holes of the tube support plates 212, 213 from the upper side until the base seat 222 of the ring holder 220 fitted to the lower end portion of the filter tube 216 comes to be in contact with the receiving seat 223 of the tube support plate 214. At the same time, the filter tube 215 is inserted through the through hole of the tube support plate 212 from the upper side until the base seat 22 of the ring holder 220 fitted to the lower end portion of the filter tube 215 comes to be in contact with the receiving seat 223 attached to the tube support plate 213, and finally, the flange 219 is fixed to the peripheral edge of the through hole of the tube support plate 212.

Further, it is preferable that the wall thickness of the tube support plates 212, 213, 214 are respectively made thicker than that shown in FIG. 19 to provide cooling medium chambers in which a cooling medium is passed, whereby the metallic parts such as the bellows and the ring holders can be indirectly cooled by heat radiation. In this case, it is possible to use the dust trapping system at an elevated temperature range exceeding a heat-resistance limit for the system consisted of metallic elements.

Thus, in the supporting structure of this embodiment, the filter tubes 215, 216 can be set by inserting them through the through holes of the upper tube support plates, and assembling and disassembling of the filter tubes 215, 216 can be easily done.

In addition, in this supporting structure, the base seat 222 of the ring holder 220 has a spherical surface which comes to be in contact with the receiving seat 223, and the bellows 218 accomodates a slight inclination of the filter tubes 215, 216. Accordingly, even though the axial line of the respective through holes of the tube support plates 212, 213, 214 is more or less deflected from the vertical line, any excessive bending stress does not take place in the filter tubes made of a fragile material, and excellent sealing properties can be maintained.

On the other hand, cleaned gas discharging pipes 224 are attached to the circumferential wall of the container 211 so as to correspond to the upper and lower sections. Each of the cleaned gas discharging pipes 224 has a throat portion 225 and an ejector nozzle 226 which is placed near the downstream side of the throat portion 225 and is open toward the upstream side of a cleaned gas passage.

Figure 14:
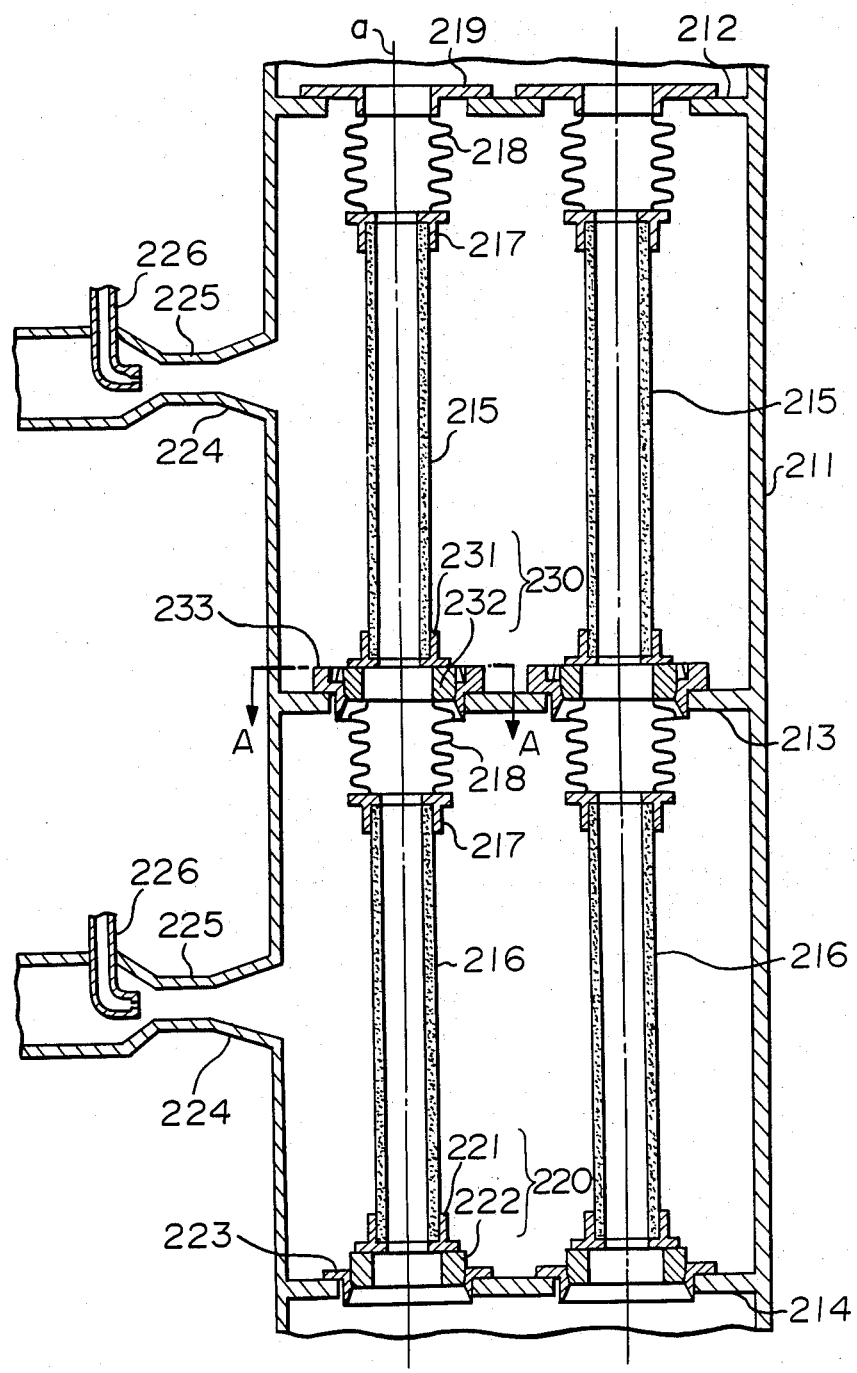
FIG. 14 is a longitudinal cross-sectional view of another embodiment of the supporting structure according to the present invention.
Figure 15:
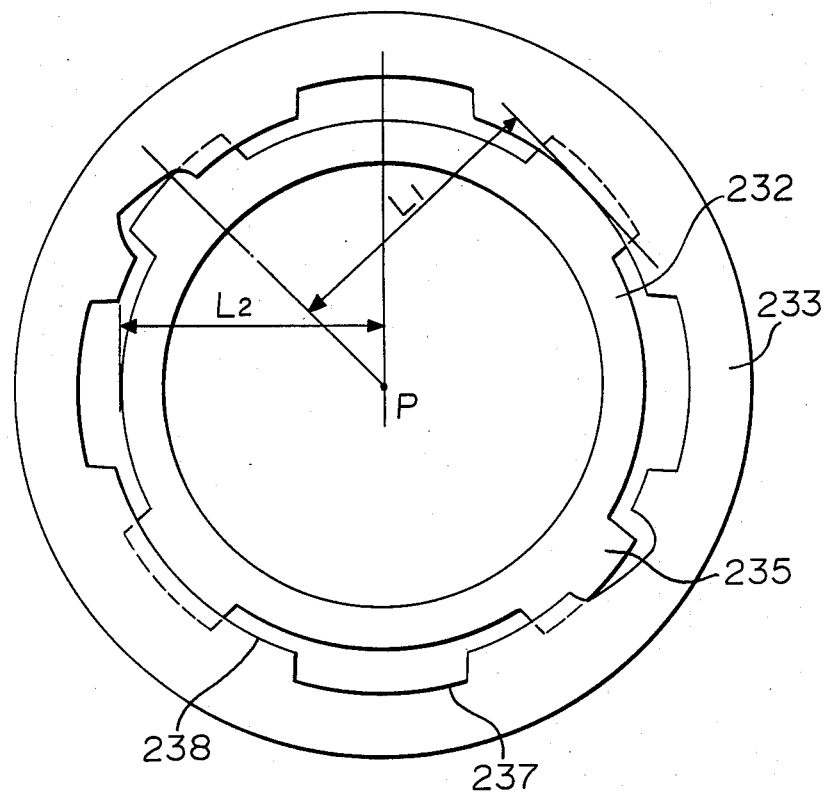
FIG. 15 is a end view viewed from a line A—A in FIG. 14.
Figure 16:
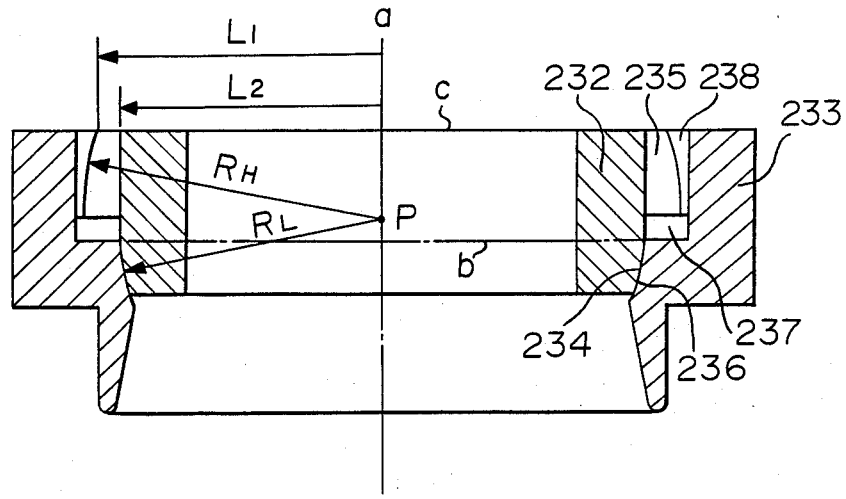
FIG. 16 is a cross-sectional view showing an important portion of the supporting structure as shown in FIG. 15.

FIGS. 14 to 16 show another embodiment of the supporting structure for ceramic tubes according to the present invention.

This embodiment shows a case that the present invention is applied to a supporting structure for porous ceramic filter tubes in a filter system.

In FIGS. 14 to 16, the same reference numerals as in FIG. 19 designate the same or corresponding parts, and therefore, description of these parts is omitted. Namely, the upper end portion of each of the respective filter tube 215 is supported by the peripheral edge of each of the through holes of the tube support plate 212 through each of the ring holders 217, the bellows 218 and the flange 219, and the lower end portion of each of the filter tubes 216 is engaged with and supported by the ring seat 223 of the tube support plate 214 through the ring holder 230.

The supporting structure for filter tubes of the present invention is used for a supporting portion between the lower end portion of the filter tube 215 and the tube support plate 213 which defines a section below the tube support plate in which back-washing operations are carried out. Namely, a ring member 231 is mounted on the outer periphery of the lower end portion of the filter tube 215 with an interposed compacted layer (not shown) which is formed by a thermally expandable mat, and a ring base seat 232 is firmly attached to the lower face of the ring member 231, these ring member 231 and the ring base seat 232 constituting a ring holder 230.

In the embodiment as shown in FIG. 14, the ring member 231 is separately prepared from the ring base seat 232 and then, they are connected together. However, the both may be constituted in a one-piece structure.

A receiving seat 233 is attached to the peripheral edge of each of the through holes formed in the tube support plate 213.

It is desirable from the viewpoint of maintaining accuracy in machining that the receiving seat 233 is separately prepared from the tube support plate 213, and thereafter, it is attached to the tube support plate 213. However, the receiving seat 233 may be previously formed integrally with the tube support plate 213.

FIGS. 15 and 16 show the structure of the ring holder 230 comprising the ring base seat 232 and the receiving seat 233.

In the FIGURES, the outer periphery of the lower portion of the ring base seat 232 is formed to have a spherical surface of a radius $R_L$ having its center at P on the axial line a of the filter tube 215, and the spherical surface constitutes an entirely continuous contacting portion 234 over the entire circumference.

Discontinuous contacting portions 235 are formed at the outer periphery of the upper portion of the ring base seat 232 at its plural positions in the circumferential direction so as to project outwardly, and the circumferential portion of the discontinuous contacting portions 235 is constituted by a spherical surface with a radius $R_H$ having its Center at P.

It is desirable in consideration of balance of force applied thereto that the discontinuous contacting portions 235 are formed at plural positions.

On the other hand, the inner periphery of the lower portion of the receiving seat 233 fixed to the tube support plate 213 is formed to be an annular receiving portion 236 which is constituted by a spherical surface with a radius $R_L$ having its center at P so that it comes to be in contact with the entirely continuous contacting portions 234 over the entire circumference.

Notched portions 237 in the number corresponding to the discontinuous contacting portions are formed at the upper portion of the receiving seat 233 so that the discontinuous contacting portions 235 can be inserted from the upper side.

A suppressing section 238 is formed at the portion other than the notched portions 237 formed at the upper side of the receiving seat 233 so as to extend to the inside of the receiving seats. The inner circumferential portion of the pressing section 238 is formed to have a spherical surface with a radius $R_H$ having a center at P so that it comes to be in contact with the discontinuous contacting portions 235.

In the construction as described above, the relation the radius $R_H$ of the spherical surface of the discontinuous contacting portions 235 and the suppressing section 238 and the radius $R_L$ of the spherical surface of the entirely continuous contacting portion 234 and the annular receiving portion 236 is preferably determined to be $R_H > R_L$ so that the ring base seat 235 can be inserted easily.

The relation between the smallest radius $L_1$ at the suppressing section 238 of the receiving seats 233 and the largest radius $L_2$ at the portion excluding the discontinuous contacting portions 235 of the ring base seats 232 is determined to be $L_1 > L_2$. Thus, the portion except the discontinuous contacting portions 235 of the ring base seats 232 can be inserted inside the receiving seats 233 without hitting against the suppressing section 238. In this case, the larger radius $R_H$ of the discontinuous contacting portions 235 is made greater than the radius LI so that the discontinuous contacting portions 235 are suppressed by the suppressing section 238. However, the discontinuous contacting portions 235 can be inserted inside the receiving seats 233 through the notched portions 237.

The position of center point P is so determined as to be above a plane b which traverses the upper edge portion of the contacting surfaces of the entirely continuous contacting portion 234 and the annular receiving portion 236 which come to mutual contact, and to be lower than a plane c traversing the upper edge portion of the plane where the discontinuous contacting portions 235 and the pressing section 238 are in contact.

If the point is lower than the plane b, the upper edge portion of the annular receiving portion 236 projects inwardly whereby the entirely continuous contacting portion 234 can not be inserted. On the other hand, if the point P is above the plane c, the suppressing section 238 can not be engaged with the upper portion of the discontinuous contacting portions 235.

In the supporting structure of this embodiment, first, the filter tube 215 attached with the ring holder 230 including the ring base seat 232 is descended from the upper side; the positions of the discontinuous contacting portions 235 and the notched portions 237 are adjusted, and the ring base seat 232 is inserted in the receiving seat 233 by passing the discontinuous contacting portions 235 through the notched portions 237. Thus, the entirely continuous contacting portion 234 comes to be in contact with the annular receiving portion 236, and the filter tube 215 is in contact with and supported by the tube support plate 214.

When the filter tube 215 is turned together with the ring base seat 232 under the above-mentioned condition, the discontinuous contacting portions 235 enter in the non-cut inner portion of the suppressing section 238, whereby the engagement between the ring base seat 232 and the receiving seat 233 is made by suppressing the upper side of the discontinuous contacting portions 235 by means of the suppressing section 238. In this case, a slight gap may result between the discontinuous contacting portions 235 and the suppressing section 238, for such slight gap does not cause any problems in a normal use.

The contacting surfaces of the entirely continuous contacting portion 234 and the annular receiving portion 236 respectively have a spherical surface with the radius $R_L$ having the center at P on the axial line of the filter tube 215, whereby they are in close contact with each other even though there is a slight inclination of the filter tube 215 with respect to the tube support plate 13 during assembling operations or in use. Accordingly, the ring base seat 232 can be easily inserted, and the filter tube can be supported with good sealing effect and without looseness.

The contacting surfaces of the discontinuous contacting portions 235 and the suppressing section 238 respectively have a spherical surface having the same center at P, whereby the discontinuous contacting portions 235 can be smoothly inserted inside the suppressing section 238 by turning the ring base seat 232 even though there is a slight inclination of the filter tube 215.

Even though a force pushing up the filter tube 215 is applied to the same in a slightly inclined state, the suppressing section 238 can hold the discontinuous contacting portions 235 without difficulty and looseness.

Figure 17:
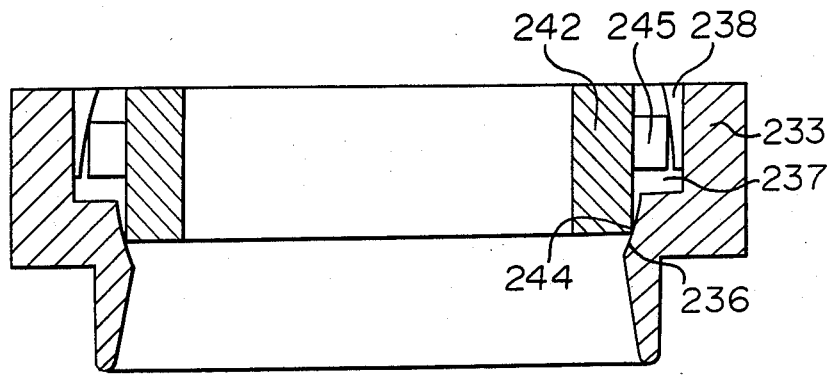
FIG. 17 is a cross-sectional view partly omitted of another embodiment of the supporting structure of the present invention.
Figure 18:
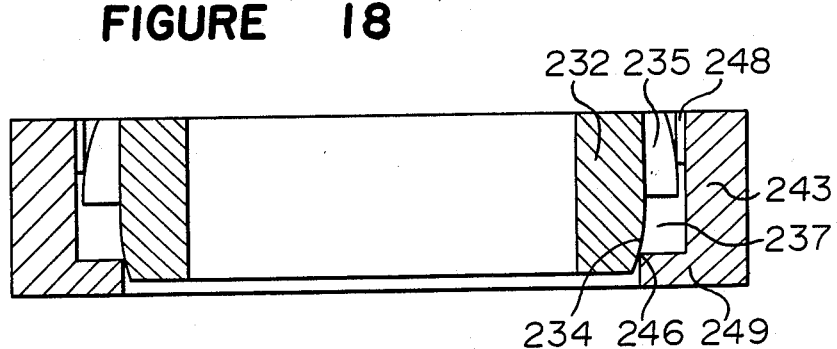
FIG. 18 is a cross-sectional view of another embodiment of the supporting structure of the present invention.

FIGS. 17 and 18 show another embodiment of the supporting structure for ceramic tubes according to the present invention.

The same reference numerals as the above-mentioned embodiments with reference to the FIGS. 14 to 16 designate the same or corresponding parts, and therefore, description of these parts is omitted.

In the supporting structure as shown in FIG. 17, the construction of the receiving seat 233 is the same as the embodiments described before, however, the construction of a ring base seat 242 is different.

The ring base seat 242 is generally cylindrical and the corner portion of the outer periphery of the lower end portion constitutes an entirely continuous contacting portion 244. Accordingly, the contacting portion 244 is brought into line contact with the annular receiving portion 236 having a spherical surface which is formed at the receiving seat 233.

Tongue-like discontinuous contacting portions 245 have respectively outer peripheries which are parts of a cylindrical surface, and an arc-like corner portion of the outer periphery of the upper end of each of the discontinuous contacting portions is in line contact with the inner periphery of the suppressing portion 238 having the spherical surface of the receiving seat 233. In the supporting structure as shown in FIG. 18, the structure of a ring base seat 232 is the same as that of the embodiment as shown in FIGS. 15 and 16, however, the construction of the receiving seat 243 is different.

The receiving seat 243 is provided with an annular rib 249 at the inner periphery of the lower portion so as to project inwardly, and the inner peripheral corner portion of the upper edge of the rib 249 has an annular receiving portion 246. The annular receiving portion 246 is in line contact with the entirely continuous contacting portion 243 having a spherical surface of the ring base seat 232. A suppressing section 248 has the inner circumferential surface which projects inwardly to form a notched cylindrically curved surface. The inner circumferential corner portion of the lower edge of the suppressing section 248 is in line contact with the discontinuous contacting portions 245 of the ring base seat 232 having a spherical surface.

In the embodiment as shown in FIGS. 17 and 18, the entirely continuous contacting portion 244 (or 234) and the annular receiving portion 236 (or 246), and the discontinuous contacting portions 245 (or 235) and the suppressing portion 238 (or 248) respectively have the relation that they are in close contact or they face with a uniform narrow gap. Accordingly, a supporting structure having excellent sealing effect and free from looseness can be obtained even though the filter tube 215 is set with a slight inclination.

In turning the filter tube, the discontinuous contacting portions 245 (or 235) can enter in the inside of the suppressing section 238 (or 248) without difficulty even though the filter tube is more or less inclined.

FIGS. 17 and 18 show an example in which the spherical surface portion and the corner portion come in line contact. However, the corner portion may be chamferred or rounded, and the spherical surface of the annular receiving portion or the suppressing section may be changed to a conical surface so that the spherical surface portion and the conical surface come in line contact. In the above-mentioned constructions, it is preferable that each center of peripheral surfaces which are in the mutual contact is located at the substantially the same position on the axial line of the filter tube, and it is preferable that the position of the center is determined in the range described with reference to FIGS. 15 and 16.

As a modification of the above-mentioned embodiment of the supporting structure, an engaging means can be provided on the ring holder attached to the upper end portion of the ceramic tubes. In this case, the ring holder attached to the upper end portion of the ceramic tubes is brought to contact with and supported by the upper tube support plates, and the same engaging means as described with reference to the above-mentioned embodiment is provided between the upper tube support plates and the upper ring holders.

Thus, in the present invention, since the ring holder for supporting an end portion of ceramic tube is engaged with the end face of the ceramic tube, a force applied in the axial direction of the ceramic tube, the force being caused by a sudden movement of the ceramic tube in the axial direction due to a pressure of back-washing gas, can be received as a pushing force applied between the ring holder and the end face of the filter tube, whereby a shear stress given to the connecting portion provided between the outer periphery of the end portion of the ceramic tube and the ring holder can be reduced. Accordingly, the compacted layer provided between the outer periphery of the end portion of the ceramic tube and the ring holder can be prevented from damaging.

Similarly, since the end face of the ceramic tube is protected by the ring holder, the damage of the ceramic tube can be avoided even when the end portion of the ceramic tube hits the tube support plate.

In accordance with another embodiment of the present invention, the supporting structure for ceramic tubes in a gas system wherein the ring holder fixed to the lower end of the ceramic tube is in contact with and supported by the peripheral edge of a through hole of the tube support plate has an engaging means which suppresses the movement of the ceramic tubes in the axial direction, the engaging means being provided by turning the ring holder with respect to the tube support plate. Accordingly, when the supporting structure of the present invention is used for a filter system, the rising of the ceramic tube due to a pressure difference caused by introducing backwashing gas can be suppressed, whereby problems such as breakage of an end of the ceramic filter tube and a connecting portion to the tubes can be avoided.

In the filter system, there often takes place a pressure difference between the sections defined by the tube support plates in the container of a gas system which treats compressed gas. For instance, there is a case that gas is removed from the container through a pipe attached to a section in the container or gas is introduced in a section through a pipe in the container. The supporting structure for fixing the ceramic tube in the container is useful for the gas system in which such operations are carried out.

In the present invention, since the ceramic tube is secured by turning the ring holder attached to the ceramic tube, works for fixing the ceramic tubes in the container are no longer required, and assembling or disassembling operations of the ceramic tubes to the container can be easily done from the upper side.

Although description for embodiments of the present invention has been made mainly as to dust trapping systems in which dust is trapped at the inner surfaces of ceramic filter tubes, the present invention can be preferably utilized as a supporting structure of filter tubes of another kind of system in which dust is trapped at the outer surfaces of ceramic filter tubes. In this case, except for the top tube support plate, each tube support plate has conduit holes through which dust containing gas is passed and dust trapped at the surfaces falls down on the hopper, and the bottom ends of the tubes are closed.

The supporting structure for ceramic tubes of the present invention can be applied for practical uses such as a heat exchanger, a filter system and so on in which ceramic tubes are used and a fluidized-bed coal combustor, a coal gasifier or the like can be constructed as a system without environmental pollution.

What is claimed is:

1. A supporting structure for ceramic tubes in a gas system which comprises:
a container, a plurality of stages of tube support plates provided in a substantially horizontal manner in said container,
ceramic tubes supported with their axial lines being substantially vertical between the vertically adjacent tube support plates so that at least a through hole formed in said tube support plates is communicated with the inner passages of said ceramic tubes,
metallic ring holders which are respectively fitted to the outer periphery of the lower end portion of said tubes with interposed compacted layers while the metallic ring holders are in contact with the lower end faces of said tubes, wherein said ring holders are respectively in contact with and are supported by said tube support plates which are placed below said ring holders.

2. The supporting structure for ceramic tubes in a gas system according to claim 1, wherein metallic ring holders are respectively fitted to the outer periphery of the upper end portion of said tubes with interposed compacted layers while said metallic ring holders are in contact with the upper end faces of said tubes, and said ring holders are substantially supported by said tube support plates which are placed above the ring holders so as to be able to be displaced.

3. The supporting structure for ceramic tubes is a gas system which comprises:
a container, a plurality of stages of tube support plates provided in a substantially horizontal manner in said container,
ceramic tubes supported with their axial lines being substantially vertical between the vertically adjacent tube support plates so that through holes formed in said tube support plates are communicated with the inner passages of said ceramic tubes,
receiving seats provided at the peripheral edges of through holes in the tube support plates respectively,
metallic ring bodies which are respectively fitted to the outer peripheries of the lower end portion of said tubes with interposed compacted layers; said ring bodies are in contact with and are supported by said receiving seats which are provided at the peripheral edges of the through holes in the tube support plates which are placed below said ring bodies, and
means for engaging said ring bodies with said tube support plates by turning said ring bodies together with said ceramic tubes, whereby the movement of the lower ends of said ceramic tubes is suppressed.

4. The supporting structure for ceramic tubes in a gas system according to claim 3, wherein said engaging means comprises a plurality of tongue portions projecting from the outer periphery of each of said ring bodies and a suppressing section formed in each of said receiving seats which are formed at the peripheral edges of the through holes in said tube support plates, and said suppressing section has notched portions opened in the upper direction so as to allow insertion of said tongue portions and, whereby when said ring body is brought in contact with the peripheral edge of each of the through holes in said tube support plates and turned in the contacting state, said engaging means engages said tongue portions with the lower side of said suppressing section so as to suppress said tongue portions.

5. The supporting structure for ceramic tubes in a gas system according to claim 3, wherein an entirely continuous contacting portion and discontinuous contacting portions, which come to contact with said receiving seat, are formed at the outer periphery of each of said ring bodies so that said entirely continuous contacting portion is formed at the lower portion of said outer periphery and said discontinuous contacting portions are formed above said entirely continuous contacting portion; an annular receiving portion which comes to contact with said entirely continuous contacting portion and a suppressing section which comes to contact with said discontinuous contacting portions is formed at the inner periphery of each of said receiving seats so that said annular receiving portion is formed at the lower portion of said receiving seat and said suppressing section is formed above said annular receiving portion respectively; notched portions are formed in said suppressing section so that said discontinuous contacting portions of each of said ring bodies are inserted from the top, and when said ring bodies are turned under the condition that said entirely continuous contacting portion is in contact with the annular receiving portion, said discontinuous contacting portions are engaged with said suppressing section, and at least one contacting surface of said entirely continuous contacting portion and said annular receiving portion are formed to have a spherical surface, and at least one contacting surface of said discontinuous contacting portions and said suppressing section are formed to have a spherical surface.

6. The supporting structure for ceramic tubes in a gas system according to claim 5, wherein the spherical surface formed at at least one contacting surface of said entirely continuous contacting portion and said annular receiving portion and the spherical surface formed at at least one contacting surface of said discontinuous contacting portions and said suppressing section respectively have their center at substantially the same place along the axial line of said tubes, and each of said centers is located above the upper edge portion of the contacting spherical surface formed between said entirely continuous contacting portion and said annular receiving portion and is located below the upper edge portion of the contacting spherical surface formed between said discontinuous contacting portions and said pressing section.

7. The supporting structure for ceramic tubes in a gas system according to claim 6, wherein said annular receiving portion and said suppressing section which are formed at the side of said receiving seat respectively have conical surfaces, and said entirely continuous contacting portion and said discontinuous contacting portions which are formed at the side of said ring bodies respectively have spherical surfaces.

8. The supporting structure for ceramic tubes in a gas system according to claim 5, wherein the contacting surface of said entirely continuous contacting portion and said annular receiving portion is a spherical surface, and the contacting surface of said discontinuous contacting portions and said suppressing section is a spherical surface.

9. The supporting structure for ceramic tubes in a gas system according to claim 6, wherein the contacting surface of said entirely continuous contacting portion and said annular receiving portion is a spherical surface, and the contacting surface of said discontinuous contacting portions and said suppressing section is a spherical surface.

10. The supporting structure for ceramic tubes in a gas system according to claim 3, wherein said ring bodies are respectively ring holders which are in contact with the lower end faces of ceramic tubes to be supported, said ceramic tubes being held in a container in which a plurality of stages of tube support plates are provided in a substantially horizontal manner in a container, and ceramic tubes are supported with their axial lines being substantially vertical between the vertically adjacent tube support plates so that through holes formed in said tube support plates are communicated with the inner passages of each of said ceramic tubes, and said ring holders are made of metal and are fitted to the outer periphery of the lower end portion of said tubes with interposed compacted layers.

11. The supporting structure for ceramic tubes in a gas system according to claim 5, wherein said ring bodies are respectively ring holders which are in contact with the lower end faces of ceramic tubes to be supported, said ceramic tubes being held in a container in which a plurality of stages of tube support plates are provided in a substantially horizontal manner in a container, and ceramic tubes are supported with their axial lines being substantially vertical between the vertically adjacent tube support plates so that through holes formed of said tube support plates are communicated with the inner passages of said ceramic tubes, and said ring holders are made of metal and are fitted to the outer periphery of the lower end portion of said tubes with interposed compacted layers.

12. The supporting structure for ceramic tubes in a gas system according to claim 6, wherein said ring bodies are respectively ring holders which are in contact with the lower end faces of ceramic tubes to be supported, said ceramic tubes being held in a container in which a plurality of stages of tube support plates are provided in a substantially horizontal manner in a container, and ceramic tubes are supported with their axial lines being substantially vertical between the vertically adjacent tube support plates so that through holes formed in said tube support plates are communicated with the inner passages of said ceramic tubes, and said ring holders are made of metal and are fitted to the outer periphery of the lower end portion of said tubes with interposed compacted layers.

13. The supporting structure for ceramic tubes in a gas system according to claim 7, wherein said ring bodies are respectively ring holders which are in contact with the lower end faces of ceramic tubes to be supported, said ceramic tubes being held in a container in which a plurality of stages of tube support plates are provided in a substantially horizontal manner in a container, and ceramic tubes are supported with their axial lines being substantially vertical between the vertically adjacent tube support plates so that through holes formed in said tube support plates are communicated with the inner passages of said ceramic tubes, and said ring holders are made of metal and are fitted to the outer periphery of the lower end portion of said tubes with interposed compacted layers.

14. The supporting structure for ceramic tubes in a gas system according to claim 9, wherein said ring bodies are respectively ring holders which are in contact with the lower end faces of ceramic tubes to be supported, said ceramic tubes being held in a container in which a plurality of stages of tube support plates are provided in a substantially horizontal manner in a container, and ceramic tubes are supported with their axial lines being substantially vertical between the vertically adjacent tube support plates so that through holes formed in said tube support plates are communicated with the inner passages of said ceramic tubes, and said ring holders are made of metal and are fitted to the outer periphery of the lower end portion of said tubes with interposed compacted layers.

15. The supporting structure for ceramic tubes in a gas system according to claim 1, wherein said compacted layers are constituted by a thermally expandable inorganic material and ceramic fibers as the major components.

16. The supporting structure for ceramic tubes in a gas system according to claim 3, wherein said compacted layers are constituted by a thermally expandable inorganic material and ceramic fibers as the major components.

17. The supporting structure for ceramic tubes in a gas system according to claim 5, wherein said compacted layers are constituted by a thermally expandable inorganic material and ceramic fibers as the major components.

18. The supporting structure for ceramic tubes in a gas system according to claim 9, wherein said compacted layers are constituted by a thermally expandable inorganic material and ceramic fibers as the major components.

19. The supporting structure for ceramic tubes in a gas system according to claim 1, wherein said ceramic tubes are gas-permeable porous filter tubes and said gas system is a filter system.

20. The supporting structure for ceramic tubes in a gas system according to claim 3, wherein said ceramic tubes are gas-permeable porous filter tubes and said gas system is a filter system.

21. The supporting structure for ceramic tubes in a gas system according to claim 5, wherein said ceramic tubes are gas-permeable porous filter tubes and said gas system is a filter system.

22. The supporting structure for ceramic tubes in a gas system according to claim 9, wherein said ceramic tubes are gas-permeable porous filter tubes and said gas system is a filter system.

23. The supporting structure for ceramic tubes in a gas system according to claim 21, wherein said filter system has means for refreshing by back-washing.

24. The supporting structure for ceramic tubes in a gas system according to claim 22, wherein said filter system has means for refreshing by back-washing.

* * * * *